US010717008B2

United States Patent
Sensui et al.

(10) Patent No.: US 10,717,008 B2
(45) Date of Patent: Jul. 21, 2020

(54) INFORMATION PROCESSING SYSTEM, INFORMATION PROCESSING APPARATUS, STORAGE MEDIUM HAVING STORED THEREIN INFORMATION PROCESSING PROGRAM, AND INFORMATION PROCESSING METHOD

(71) Applicants: NINTENDO CO., LTD., Kyoto (JP); DeNA CO., LTD., Tokyo (JP)

(72) Inventors: Kazuyoshi Sensui, Kyoto (JP); Masahiro Nitta, Kyoto (JP); Yasuharu Ohta, Kyoto (JP); Mai Yamamoto, Kyoto (JP); Junpei Horita, Kyoto (JP); Ken Nakatani, Tokyo (JP); Tatsuya Wakasa, Tokyo (JP); Yurie Tokutake, Tokyo (JP)

(73) Assignees: Nintendo Co., Ltd., Kyoto (JP); DeNa Co., Ltd., Tokyo (JP)

( * ) Notice: Subject to any disclaimer, the term of this patent is extended or adjusted under 35 U.S.C. 154(b) by 132 days.

(21) Appl. No.: 16/163,919

(22) Filed: Oct. 18, 2018

(65) Prior Publication Data
US 2019/0118093 A1 Apr. 25, 2019

(30) Foreign Application Priority Data
Oct. 20, 2017 (JP) .................... 2017-203480

(51) Int. Cl.
*A63F 13/00* (2014.01)
*A63F 9/24* (2006.01)
(Continued)

(52) U.S. Cl.
CPC .............. *A63F 13/69* (2014.09); *A63F 13/50* (2014.09); *A63F 13/57* (2014.09); *A63F 13/58* (2014.09); *A63F 13/822* (2014.09)

(58) Field of Classification Search
CPC .......... A63F 13/45; A63F 13/47; A63F 13/60; A63F 13/67; A63F 13/69; A63F 13/50;
(Continued)

(56) References Cited

U.S. PATENT DOCUMENTS

| 8,784,170 B1* | 7/2014 | Murakami | .............. A63F 13/00 463/25 |
| 9,050,538 B2 | 6/2015 | Sugiyama et al. | |

(Continued)

FOREIGN PATENT DOCUMENTS

JP 2017-012266 1/2017

OTHER PUBLICATIONS

Auto Campsite, a web Animal Crossing Walk-Through [online] Oct. 7, 2017, searched on Mar. 25, 2019, https://web.archive.org/web/20171007210634/http://www.doumori.com/3ds_facilities/autocamp.html (4 pgs.).

(Continued)

*Primary Examiner* — Milap Shah
(74) *Attorney, Agent, or Firm* — Nixon & Vanderhye PC

(57) ABSTRACT

An example of an information processing system manages a character-associated parameter associated with each of a plurality of character objects, and a player-associated parameter associated with a player. Further, the information processing system stores an appearance condition associated with each of the plurality of character objects. The information processing system specifies at least one target character object among the plurality of character objects. When the player-associated parameter and the character-associated parameter associated with a target character object satisfy the appearance condition associated with the target character object, the information processing system permits the target character object to appear in a predetermined region in a virtual space.

22 Claims, 19 Drawing Sheets

(51) Int. Cl.
*A63F 13/69* (2014.01)
*A63F 13/58* (2014.01)
*A63F 13/822* (2014.01)
*A63F 13/57* (2014.01)
*A63F 13/50* (2014.01)

(58) Field of Classification Search
CPC ........ A63F 13/53; A63F 13/537; A63F 13/57; A63F 13/577; A63F 13/58; A63F 13/822
See application file for complete search history.

(56) References Cited

U.S. PATENT DOCUMENTS

| | | | |
|---|---|---|---|
| 2004/0248649 A1* | 12/2004 | Arai | A63F 13/10 463/32 |
| 2004/0259636 A1* | 12/2004 | Machida | A63F 13/10 463/30 |
| 2007/0015582 A1* | 1/2007 | Ha | A63F 13/332 463/40 |
| 2007/0206003 A1* | 9/2007 | Yoshida | G06T 15/00 345/419 |
| 2012/0303343 A1 | 11/2012 | Sugiyama et al. | |
| 2012/0310610 A1 | 12/2012 | Ito et al. | |
| 2013/0072296 A1* | 3/2013 | Miyazaki | A63F 13/10 463/31 |
| 2013/0093765 A1* | 4/2013 | Buchauer | A63F 13/60 345/419 |
| 2013/0130762 A1 | 5/2013 | John et al. | |
| 2013/0316819 A1* | 11/2013 | Kinashi | A63F 13/00 463/31 |
| 2014/0004947 A1 | 1/2014 | Yamaguchi et al. | |
| 2014/0031115 A1* | 1/2014 | Tanabe | A63F 13/69 463/31 |
| 2015/0165325 A1* | 6/2015 | Yamamura | A63F 13/35 463/42 |
| 2016/0380677 A1 | 12/2016 | Moro et al. | |

OTHER PUBLICATIONS

[Tagatame] Recommendation of the character which can be chosen with the unit summons ticket which can be chosen?—a TVCM broadcast commemoration shop, Game Rankers [online] Dec. 2, 2016, searched on Mar. 25, 2019, http://game-rankers.com/post-39/ (8 pgs.).

In relation to a school, Harvest Moon Land of Beginning, [online] Aug. 10, 2017, searched on Mar. 25, 2019, https://web.archive.org/web/20170810025630/http://i-love-game.com/bokumono-hajimari/love/000a.php (3 pgs.).

Wedding candidates "Yuri", Harvest Moon Land of Beginning, [online] Oct. 8, 2016, searched on Mar. 25, 2019, https://web.archive.org/web/20161008105137/http://i-love-game.com/bokumono-hajimari/love/005.php (5 pgs.).

Konami Official Guide Perfect Series Tokimeki Memorial-forever with you—Official Guide, Japan, Konami Corporation, Jun. 29, 1997, first edition, p. 29 (4 pgs.).

Notice of Reasons for Refusal dated Apr. 19, 2019 issued in JP application No. 2017-203472 (5 pgs.) and its Machine translation (6 pgs.).

Notice of Reasons for Refusal dated Apr. 10, 2019 issued in JP application No. 2017-203480 (5 pgs.) and its Machine translation (8 pgs.).

U.S. Appl. No. 16/163,894, entitled "Information Processing System, Information Processing Apparatus, Storage Medium Having Stored Therein Information Processing Program, and Information Processing Method" to Sensui, filed Oct. 18, 2018 (88 pages).

"Smart Phone Apps Neko Atsume(Kitty Collector)", Online, Hit-Point Co., Ltd., searched on Sep. 8, 2017, http://nekoatsume.com/ and its English page: http://nekoatsume.com/en/ (homepage data) (6 pages).

Notice of Allowance dated Sep. 27, 2019 issued in U.S. Appl. No. 16/163,894 (9 pgs.).

Extended European Search Report dated Nov. 28, 2018 issued in European Application No. 18201530.5 (8 pgs.).

Notice of Reasons for Refusal dated Apr. 9, 2019 issued in JP application No. 2017-203472 (5 pgs.) and its Machine translation (6 pgs.).

* cited by examiner

Fig.8

| ANIMAL CHARACTER | INVITATION CONDITION ||
|---|---|---|
| | LEVEL OF INTIMACY | FURNITURE |
| CHARACTER A | 3 OR HIGHER | CHAIR, TABLE |
| CHARACTER B | 5 OR HIGHER | CHAIR, BOOKSHELF |
| CHARACTER C | 5 OR HIGHER | SOFA, BED, HAMMOCK |
| ⋮ | ⋮ | ⋮ |

INFORMATION PROCESSING SYSTEM, INFORMATION PROCESSING APPARATUS, STORAGE MEDIUM HAVING STORED THEREIN INFORMATION PROCESSING PROGRAM, AND INFORMATION PROCESSING METHOD

CROSS REFERENCE TO RELATED APPLICATION

The disclosure of Japanese Patent Application No. 2017-203480, filed on Oct. 20, 2017, is incorporated herein by reference.

FIELD

The technology relates to an information processing system, an information processing apparatus, a storage medium having stored therein an information processing program, and an information processing method for causing an object to appear in a virtual space.

BACKGROUND AND SUMMARY

Conventionally, there is a technique for a game where a character object is caused to appear in a virtual space. For example, there is a game where an item (e.g., cat food) is placed in a virtual space, thereby causing a character object (e.g., a cat object) to appear.

Conventionally, various types of character objects can be caused to appear so long as items are completed. Thus, there is room for improvement in interest.

Therefore, the present application discloses an information processing system, an information processing apparatus, a storage medium having stored therein an information processing program, and an information processing method that are capable of improving interest regarding causing a character object to appear.

(1)

An example of an information processing system according to the present specification is an information processing system including parameter management means, appearance condition storage means, character specifying means, and appearance permission means. The parameter management means manages a character-associated parameter associated with each of a plurality of character objects, and a player-associated first parameter associated with a player and indicating the number of items of a first type owned in a game by the player. The appearance condition storage means stores in the memory an appearance condition associated with each of the plurality of character objects. The character specifying means specifies at least one target character object from among the plurality of character objects. The appearance permission means, when the player-associated first parameter and the character-associated parameter associated with the target character object satisfy the appearance condition associated with the target character object, permits the target character object to appear in a predetermined region in the virtual space.

According to the above configuration (1), when an appearance condition regarding both a character-associated parameter and a player-associated first parameter is satisfied, a character object is permitted to appear. According to this, to cause a certain character object to appear in a predetermined region, a player advances a game so as to the appearance condition is satisfied, taking into account both the character-associated parameter regarding the character object and the player-associated first parameter set regardless of the character object. According to this, it is possible to improve interest regarding causing the character object to appear in the predetermined region.

(2)

In accordance with a predetermined condition regarding a character object placed in the virtual space being satisfied, the parameter management means may change the character-associated parameter associated with the character object.

According to the above configuration (2), in accordance with the fact that a character object placed in a virtual space satisfies a predetermined condition, the character-associated parameter changes. According to this, to satisfy the appearance condition for the character object, first, the player performs an operation so that the predetermined condition regarding the character object is satisfied. Thus, according to the above configuration (2), by the above operation until the appearance condition for the character object is satisfied, it is possible to cause the player to have affection for the character object. According to this, the appearance condition for the character object for which the player has affection is satisfied, and the character object is permitted to appear. Thus, it is possible to increase a sense of fulfillment and/or a sense of satisfaction when the character object appears. Thus, it is possible to improve interest.

(3)

The appearance condition may be a condition satisfied when the character-associated parameter is equal to or greater than a predetermined value. When a predetermined action on the character object is performed by the player or a player character operated by the player, the parameter management means may increase the character-associated parameter associated with the character object.

According to the above configuration (3), by a predetermined action on the character object, the player can increase the character-associated parameter so as to satisfy the appearance condition. According to this, by the above predetermined action performed until the appearance condition for the character object is satisfied, it is possible to cause the player to have affection for the character object. Thus, also according to the above configuration (3), similarly to the above configuration (2), it is possible to improve interest.

(4)

In accordance with an operation performed by the player and on the character object placed in the virtual space, the player-associated first parameter may be changed.

According to the above configuration (4), until the appearance condition for the character object is satisfied, an operation of the player on the character object is performed, and by this operation, it is possible to cause the player to have affection for the character object. According to this, the appearance condition for the character object for which the player has affection is satisfied, and the character object is permitted to appear. Thus, it is possible to increase a sense of fulfillment and/or a sense of satisfaction when the character object appears. Thus, it is possible to improve interest.

(5)

Based on a predetermined action performed between the player or a player character operated by the player and the character object placed in the virtual space, the parameter management means may change the player-associated first parameter.

According to the above configuration (5), the player-associated first parameter changes by an interaction between the player or a player character and the character object. According to this, to satisfy the appearance condition for the character object, first, the player interacts with a character object (which, however, is not limited to the character object regarding the appearance condition). Thus, according to the above configuration (5), until the appearance condition for the character object is satisfied, it is possible to give the player the opportunity to have affection for the character object. Then, the player has affection for the character object, whereby it is possible to increase a sense of fulfillment and/or a sense of satisfaction when the character object appears. Thus, it is possible to improve interest.

(6)

The parameter management means may further manage a player-associated second parameter associated with the player. At this time, the parameter management means, under the condition that the player-associated second parameter is changed by a predetermined value, may change the player-associated first parameter.

According to the above configuration (6), to change the player-associated first parameter, first, the player changes the player-associated second parameter. According to this, it is possible to improve the level of strategy for changing the player-associated first parameter.

(7)

In accordance with a predetermined action being performed between the player or a player character operated by the player and the character object placed in the virtual space, the parameter management means may change the player-associated second parameter.

According to the above configuration (7), by an interaction performed between the player or a player character and the character object, the player-associated second parameter changes. According to this, by an interaction for changing the player-associated second parameter, it is possible to give the player the opportunity to have affection for the character object. Thus, also according to the above configuration (7), similarly to the above configuration (5), until the appearance condition for the character object is satisfied, it is possible to give the player the opportunity to have affection for the character object.

(8)

The player-associated first parameter may indicate the number of items of a first type owned in the game by the player. The player-associated second parameter may indicate the number of items of a second type owned in the game by the player.

According to the above configuration (8), to satisfy the appearance condition, the player performs a game operation for converting an item of a first type into an item of a second type. Consequently, it is possible to improve the level of strategy regarding an acquisition method for acquiring the item of the second type. Thus, it is possible to improve the interest of the game.

(9)

The parameter management means may manage the player-associated second parameter of a plurality of types. At this time, in accordance with a predetermined action being performed between the player or a player character operated by the player and the character object placed in the virtual space, the parameter management means may change the player-associated second parameter of a type that can be used to change the player-associated first parameter related to the appearance condition associated with the character object.

According to the above configuration (9), when a predetermined action regarding the character object is performed, a player-associated second parameter of a type related to the appearance condition for the character object is changed.

According to this, it is possible to cause the player to recognize the type of the player-associated second parameter for satisfying the appearance condition for the character object in an easily understandable manner.

(10)

The predetermined action may be at least either of conversing with the character object and fulfilling a request from the character object.

According to the above configuration (10), by a conversation with the character object and/or a request, it is possible to cause the player to have affection for the character object.

(11)

The request may be fulfilled by delivering a predetermined item to each of the character objects.

According to the above configuration (11), it is possible to improve the level of strategy regarding a game operation for fulfilling the request.

(12)

The information processing system may further include placement management means for managing placement states of the plurality of character objects in the virtual space. The placement management means changes the placement state of at least one character object among the plurality of character objects in the virtual space in accordance with time.

According to the above configuration (12), the character object placed in the virtual space is changed in accordance with time. Thus, it is possible to give the player the opportunity to view or interact with more types of character objects.

(13)

The placement management means may change the placement state of the character object in the virtual space in accordance with time, the character object being different from the target character object permitted to appear in the predetermined region in accordance with the satisfaction of the appearance condition.

According to the above configuration (13), the placement state of the character object satisfying the appearance condition is not changed in accordance with time. Thus, it is possible to give the player more opportunities to view or interact with the character object. For example, the player plays the game so that a favorite character object satisfies the appearance condition, and thereby can enjoy the game.

(14)

The at least one computer processor may permit a plurality of the target character objects to appear in the predetermined region.

According to the above configuration (14), it is possible to cause a plurality of character objects to appear in the predetermined region. Thus, the player can enjoy enlivening the predetermined region by causing many characters object to appear in the predetermined region in addition to the enjoyment of causing a favorite character object to appear in the predetermined region. Thus, it is possible to further improve interest.

(15)

In accordance with an instruction given by the player, the placement management means may cause the target character object placed in the predetermined region in accordance with the target character object being permitted to appear in the predetermined region, to leave the predetermined region.

According to the above configuration (15), even when the character object satisfies the appearance condition, it is possible to cause the character object to leave the predetermined region in accordance with an instruction given by the player. Thus, the player can change a character object placed in the predetermined region more freely.

(16)

The at least one computer processor may cause the target character object permitted to appear in the predetermined region to appear in the predetermined region in a state where the target character object leaves the predetermined region, and in accordance with an instruction given by the player, and regardless of whether or not the appearance condition is satisfied at a time when the instruction is given.

According to the above configuration (16), regarding the character object that has left in accordance with an instruction given by the player after the appearance condition is satisfied, the player can easily cause the character object to appear in the predetermined region again. This can improve the convenience for the player.

(17)

The information processing system may further include object placement means for, in accordance with a placement instruction given by the player, placing a placement object in the predetermined region. The player-associated first parameter may indicate the number of the placement objects owned in the game by the player. The appearance condition may be that the placement object determined in accordance with the character object associated with the appearance condition is placed in the predetermined region.

According to the above configuration (17), the player places in the predetermined region both the character object and a placement object for causing the character object to appear. According to this, it is possible to cause the player to have affection for the placement object in addition to the character object. Thus, it is possible to improve the interest of the game.

(18)

When the appearance condition is satisfied, and in accordance with an automatic placement instruction given by the player, the object placement means may automatically determine a placement position in the predetermined region, thereby placing the placement object determined in accordance with the character object associated with the appearance condition.

According to the above configuration (18), the player does not need to indicate the placement position of the placement object. Thus, it is possible to simplify an operation for causing the character object to appear.

(19)

When the placement object is placed in the predetermined region in accordance with the placement instruction given by the player, then in accordance with a restoration instruction given by the player, the at least one computer processor may restore the placement of the placement object in the predetermined region to a state before the placement corresponding to the placement instruction is made.

According to the above configuration (19), when the placement object is placed to satisfy the appearance condition for the character object, the player can easily restore the placement state of the placement object to the previous state. According to this, for example, the player can easily restore the placement state of the placement object to a favorite placement state.

(20)

The information processing system may further include character control means for, in the predetermined region, causing the target character object satisfying the appearance condition to perform an action on the placement object determined in accordance with the target character object.

According to the above configuration (20), an information processing system causes the character object and the placement object used to cause the character object to appear to perform actions in association with each other. According to this, it is possible to present to the player the association between the character object and the placement object in an easily understandable manner, and it is also possible to cause the player to have affection for the character object and the placement object more strongly.

(21)

The information processing system may further include permission candidate management means for managing a permission candidate character object that can be specified as the target character object among the plurality of character objects. The permission candidate management means increases the number of the permission candidate character objects in accordance with the number of character objects satisfying the appearance condition.

According to the above configuration (21), the number of permission candidate characters increases in accordance with the number of character objects satisfying the appearance condition. Thus, it is possible to give the player the motivation to perform a game operation for satisfying the appearance condition.

It should be noted that the present specification discloses an example of an information processing apparatus or a server including all or a part of the means in the above (1) to (21). Further, the present specification discloses an example of a storage medium having stored therein an information processing program for causing a computer of an information processing apparatus (or a server) to function as the means in the above (1) to (21). Further, the present specification discloses an example of an information processing method executed by an information processing system in the above (1) to (21).

According to the above information processing system, the above information processing apparatus, the above storage medium having stored therein an information processing program, and the above information processing method, it is possible to improve interest regarding causing a character object to appear.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 8 is a diagram showing a non-limiting example of an invitation condition set with respect to each animal character;

DETAILED DESCRIPTION OF NON-LIMITING EXAMPLE EMBODIMENTS

1. Configuration of Information Processing System

Figure 1:
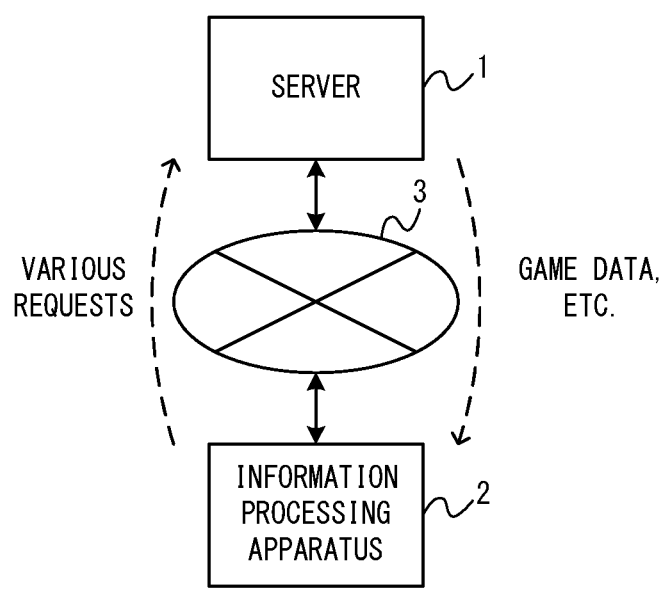
FIG. 1 is a block diagram showing a non-limiting example of the configuration of an information processing system according to an exemplary embodiment.

A description is given below of an information processing system, an information processing apparatus, a storage medium having stored therein an information processing program, and an information processing method according to an exemplary embodiment. First, a description is given of the overall configuration of the information processing system according to the exemplary embodiment, and the configurations of an information processing apparatus and a server included in the information processing system. FIG. 1 is a block diagram showing an example of the configuration of the information processing system according to the exemplary embodiment. As shown in FIG. 1, the information processing system includes a server 1 and an information processing apparatus 2. The server 1 and the information processing apparatus 2 can connect to a network 3 such as the Internet and/or a mobile communication network. The server 1 and the information processing apparatus 2 can communicate with each other via the network 3.

The server 1 is a server for providing a service regarding an application (specifically, a game application) to be executed by the information processing apparatus 2. In the exemplary embodiment, the server 1 is a game server for executing a game in the information processing apparatus 2 and provides an environment for executing game processing in the information processing apparatus 2. For example, in accordance with a request from the information processing apparatus 2 for executing game processing, the server 1 executes game processing where necessary and transmits game data corresponding to the request to the information processing apparatus 2 (see FIG. 1).

The information processing apparatus 2 is an example of a terminal apparatus owned by a user, and for example, is a smartphone, a mobile or stationary game apparatus, a mobile phone, a tablet terminal, a personal computer, a wearable terminal, or the like. The information processing apparatus 2 can execute a game program (in other words, a game application) for a game regarding which the server 1 provides a service.

(Specific Example of Configuration of Server 1)

Figure 2:
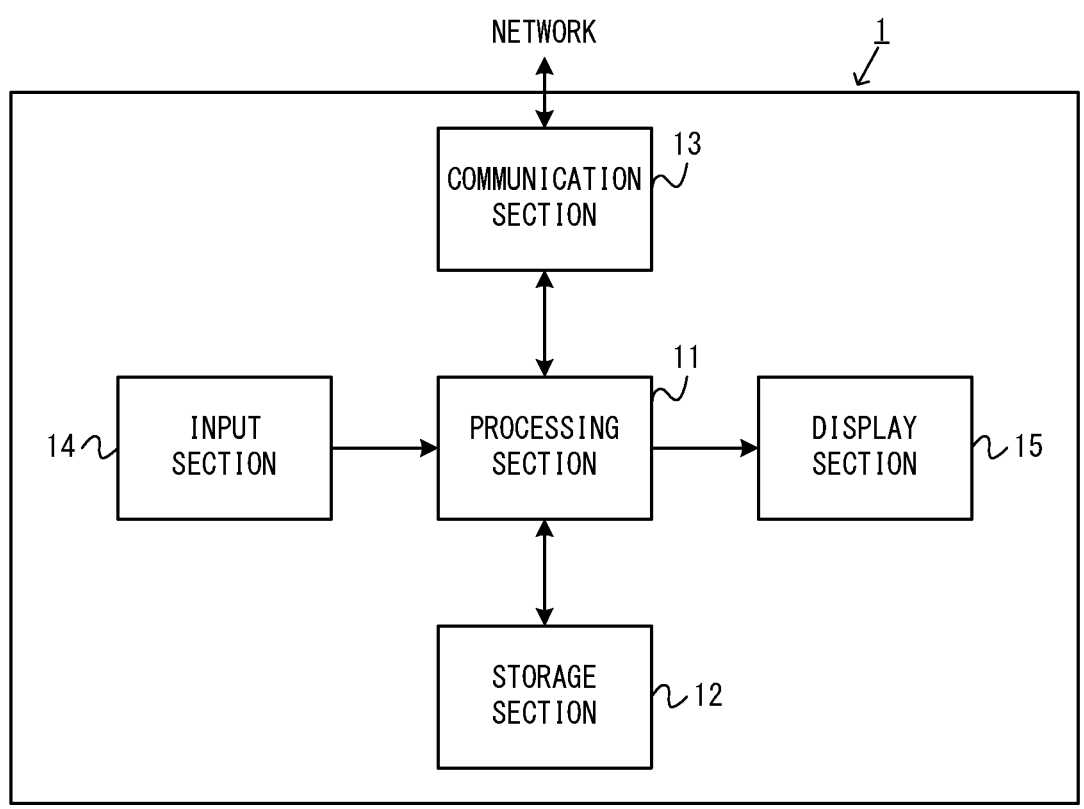
FIG. 2 is a block diagram showing a non-limiting example of the configuration of a server.

FIG. 2 is a block diagram showing an example of the configuration of the server 1. Components shown in FIG. 2 and included in the server 1 are achieved by one or more information processing apparatuses. Here, in the present specification, a "server" refers to a single information processing apparatus (i.e., a server apparatus), or in a case where the function of the server is achieved by a plurality of server apparatuses, refers to the entirety of a server apparatus group (i.e., a server system). That is, a "server" may be a server apparatus, or may be a server system. It should be noted that in a case where the server system includes a plurality of information processing apparatuses, the information processing apparatuses may be placed at the same location, or may be placed at different locations. It should be noted that the hardware configuration of the server 1 according to the exemplary embodiment may be similar to the hardware configuration of a conventional server.

As shown in FIG. 2, the server 1 includes a processing section 11 and a storage section 12. The processing section 11 is electrically connected to components 12 to 15 of the server 1. The processing section 11 includes a CPU (Central Processing Unit) and a memory. In the server 1, various types of information processing are executed by the CPU executing a program stored in the storage section 12, using the memory. The storage section 12 is any storage device (also referred to as "storage medium") accessible by the processing section 11. The storage section 12 stores a program to be executed by the processing section 11, data to be used in information processing by the processing section 11, data obtained by the information processing, and the like. In the exemplary embodiment, the storage section 12 also stores at least a program for game processing to be executed on the server side for game processing to be executed by the information processing apparatus 2.

The server 1 includes a communication section 13. The communication section 13 has the function of connecting to the network 3 and communicating with another apparatus (e.g., the information processing apparatus 2) via the network 3. Further, the server 1 includes an input section 14 and a display section 15 as input and output interfaces.

(Specific Example of Configuration of Information Processing Apparatus 2)

Figure 3:
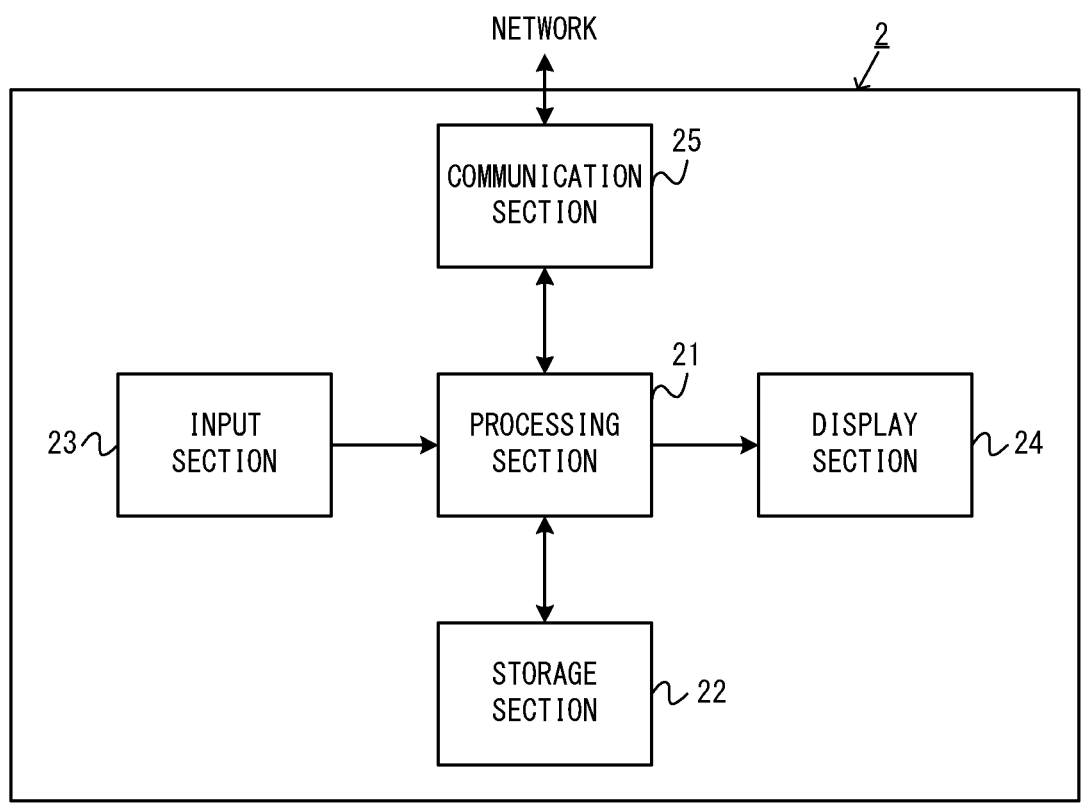
FIG. 3 is a block diagram showing a non-limiting example of the configuration of an information processing apparatus.

FIG. 3 is a block diagram showing an example of the configuration of the information processing apparatus 2. As shown in FIG. 3, the information processing apparatus 2 includes a processing section 21 and a storage section 22. The processing section 21 is electrically connected to components 22 to 25 of the information processing apparatus 2. The processing section 21 includes a CPU and a memory. In the information processing apparatus 2, various types of information processing are executed by the CPU executing a program (more specifically, a game program) stored in the storage section 22, using the memory. The storage section 22 stores a program to be executed by the processing section 21, data to be used in information processing by the processing section 21, data obtained by the information processing, and the like. The storage section 22 may be a storage medium built into a main body apparatus (specifically, an apparatus in which the processing section 21 is provided) of the information processing apparatus 2, or may be a storage medium (e.g., a card storage medium) attachable to and detachable from the main body apparatus.

The information processing apparatus 2 includes an input section 23. The input section 23 may be any input device for receiving an input provided by the user. In the exemplary embodiment, the input section 23 includes a touch panel provided on a screen of the display section 24 described later. It should be noted that the input section 23 may include buttons, inertial sensors (e.g., an acceleration sensor and a gyro sensor), and/or the like in addition to (or instead of) the touch panel. The input section 23 may be an input device provided in the main body apparatus of the information processing apparatus 2, or may be an input device (e.g., a game controller) separate from the main body apparatus.

The information processing apparatus 2 includes a display section 24. The display section 24 displays an image (e.g., a game image or the like) generated by information processing executed by the processing section 21 of the information processing apparatus 2. The display section 24 may be a display device provided in the main body apparatus of the information processing apparatus 2, or may be a display device separate from the main body apparatus. It should be noted that the information processing apparatus 2 may include a speaker, a microphone, a camera, and/or the like.

The information processing apparatus 2 includes a communication section 25. In the exemplary embodiment, the communication section 25 has the function of connecting to a mobile communication network (in other words, a mobile phone network) and performing communication. That is, the information processing apparatus 2 (specifically, the processing section 21) connects to the network 3 via the mobile communication network using the communication section 25 (in other words, via the communication section 25) and communicates with another apparatus (e.g., the server 1 or the like). It should be noted that the configuration of a communication section for the information processing apparatus 2 to perform communication via the network 3 is optional. For example, the communication section 25 may have the function of connecting to a wireless LAN by a communication module authenticated for Wi-Fi, or may have both the function of connecting to a mobile communication network and the function of connecting to a wireless LAN.

2. Overview of Process in Information Processing System

A description is given below of an overview of a process executed in the information processing system according to the exemplary embodiment. In the exemplary embodiment, in the information processing apparatus 2, a game where a player character performs an interaction such as a conversation with another character (specifically, a non-player character) is executed.

[2-1. Overview of Game]

Figure 4:
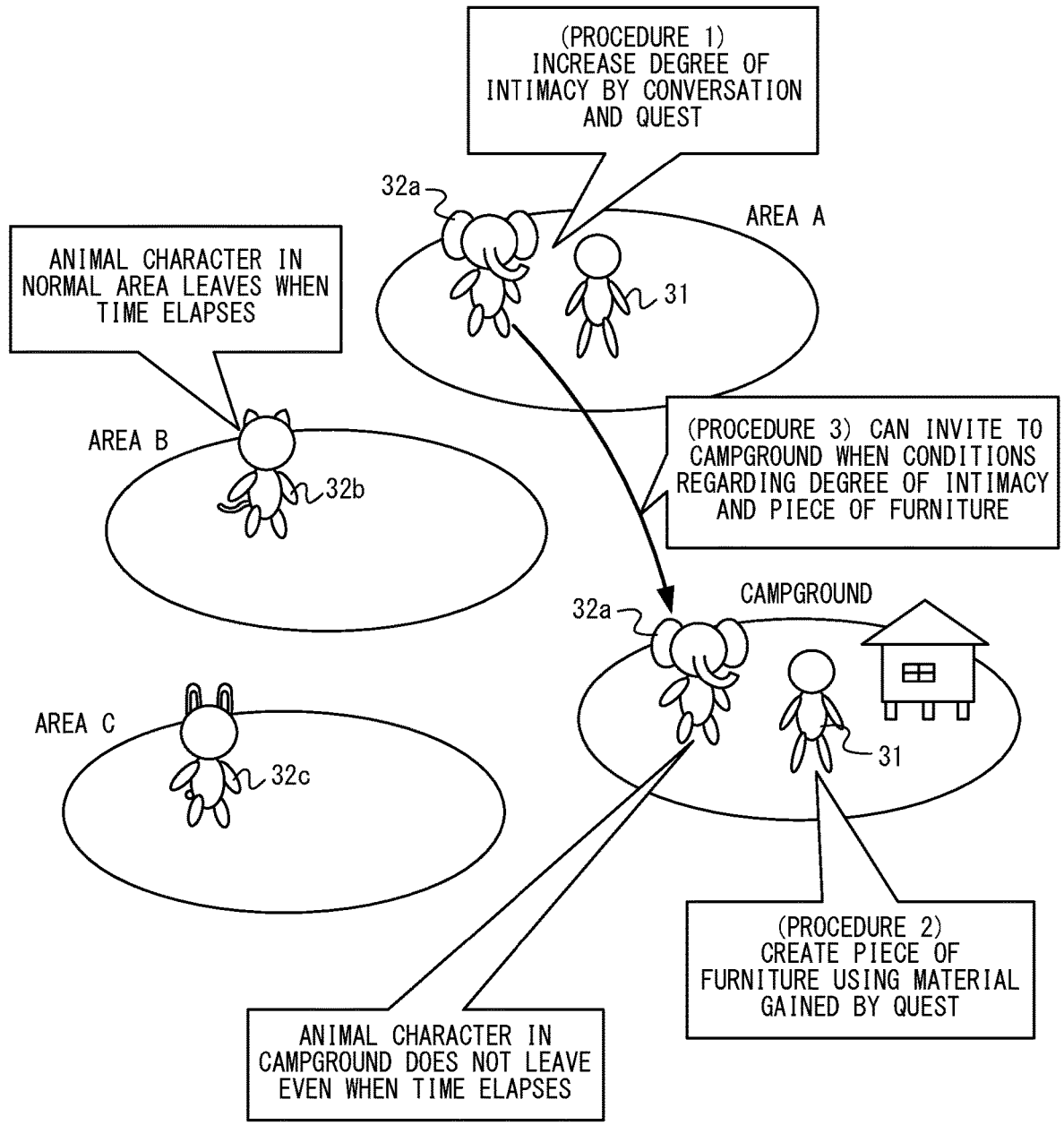
FIG. 4 is a diagram showing a non-limiting example of the progress of a game.

First, with reference to FIG. 4, an overview of the game is described. FIG. 4 is a diagram showing an example of the progress of the game. As shown in FIG. 4, in the exemplary embodiment, a virtual game space includes a plurality of areas. In the areas, animal characters (animal characters 32*a* to 32*c* in FIG. 4) as non-player characters that are targets with which a player character 31 is to interact are placed. It should be noted that the areas may be continuously linked together, or may not be continuous. For example, in the game space, a campground area described later may be linked to another area. Specifically, a partial region in the game space (e.g., a region around a lake in the game space) may be set as the campground area. Further, unless the animal characters are distinguished from each other, the animal characters will occasionally be referred to as an "animal character 32".

In the exemplary embodiment, the game space includes normal areas (areas A to C in FIG. 4) and a campground area (hereinafter simply referred to as a "campground") as a plurality of areas. Although the details will be described later, an animal character placed in each normal area leaves the normal area when a predetermined time elapses since the animal character appears. Then, a new animal character appears in place of the animal character (however, as a result of the fact that the animal character that has left happens to be the same as the animal character that newly appears, it may seem as if the animal character does not leave). Here, in this game, it is possible to invite an animal character that can be placed in the normal areas to the campground (in other words, place the animal character in the campground). The animal character invited to the campground does not leave even when the predetermined time elapses (it should be noted that the animal character can leave in accordance with an instruction given by a player). In the example shown in FIG. 4, when time elapses, the animal characters 32*b* and 32*c* placed in the normal areas leave (and may appear again after that). On the other hand, even when the time for the animal characters 32*b* and 32*c* to leave arrives, the animal character 32*a* invited to the campground does not leave, and continues to be placed. Thus, the player can view the animal character 32*a* invited to the campground at any time, or can interact with the animal character 32*a* at any time.

Based on the above, one of the purposes of this game is to invite an animal character that appears in the normal areas to the campground (in other words, changes the placement area of the animal character to the campground), and cause the animal character to stay in the campground. For example, the player can invite a favorite animal character to the campground and interact with the animal character, thereby enjoying the game.

For the above purpose, the player advances the game roughly in order of the following procedures 1 to 3 (see FIG. 4).

(Procedure 1) The player performs interactions (a conversation and a quest in the exemplary embodiment) with an animal character, thereby increasing the degree of intimacy with the animal character and gaining a material.

(Procedure 2) The player creates a piece of furniture using the gained material.

(Procedure 3) The player satisfies conditions regarding the degree of intimacy and the piece of furniture, thereby inviting the animal character to the campground.

In this game, however, the player does not necessarily need to advance the game in accordance with the above procedures, and the player character 31 can freely act in the game space.

[2-2. Interaction with Animal Character]

Next, a description is given of interaction actions between the player character and the animal character in the above (Procedure 1). In accordance with an operation of the player, the player character 31 moves in the game space and performs the action of interacting with the animal character 32. In the exemplary embodiment, the player can cause the player character 31 to perform a conversation with the animal character 32 and an action regarding a quest from the animal character 32 (specifically, the acceptance of the quest and the report of the fulfillment of the quest) as interaction actions with the animal character 32. The player causes the player character 31 to perform interaction actions with the animal character in order to "increase the degree of intimacy" and "create a piece of furniture" necessary to invite the animal character 32 to the campground.

Figure 5:
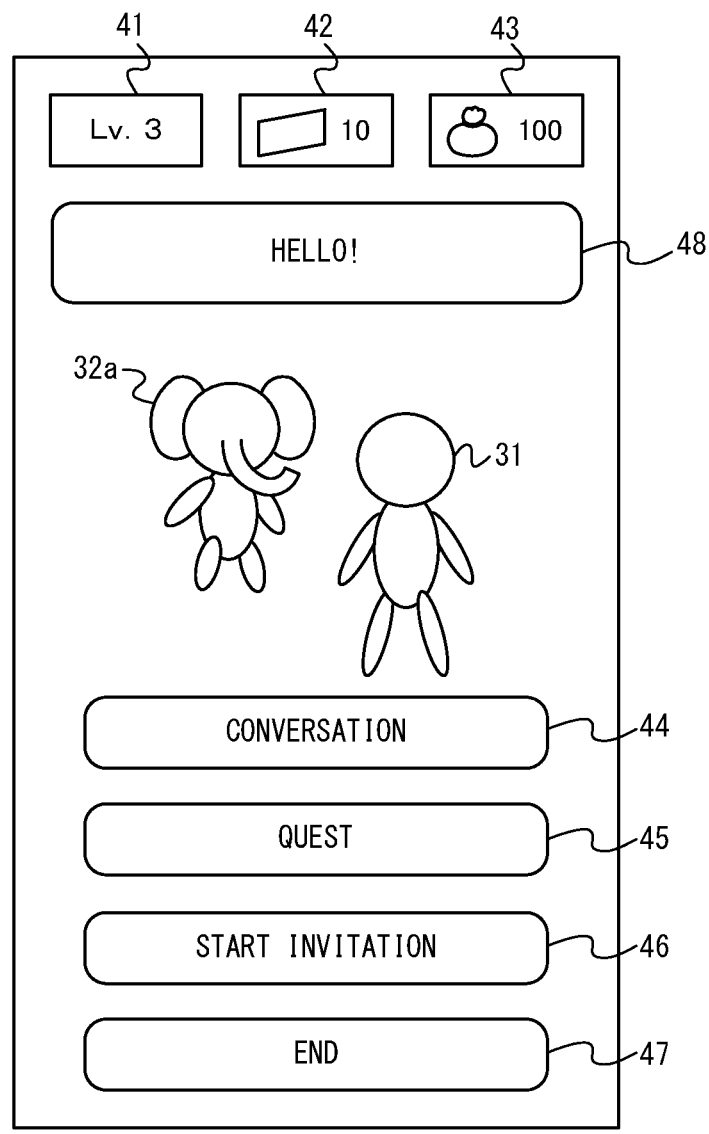
FIG. 5 is a diagram showing a non-limiting example of a game image (referred to as an "interaction scene image") representing a scene where a player character interacts with an animal character.

FIG. 5 is a diagram showing an example of a game image (referred to as an "interaction scene image") representing a scene where the player character interacts with the animal character. In the exemplary embodiment, in accordance with the fact that the player gives a predetermined interaction start instruction (e.g., performs the operation of touching the position of the animal character 32 on the screen of the display section 24) in the state where the player character 31 is located near the animal character 32 in the game space, the player character 31 and the animal character 32 enter an interaction state. It should be noted that in the exemplary embodiment, the state where the player character 31 and the animal character 32 can interact with each other is referred to as an "interaction state". In the interaction state, the interaction scene image is displayed on the display section 24.

As shown in FIG. 5, the interaction scene image includes an image representing the game space including the player character 31 and the animal character 32 as a target of an interaction. Further, the interaction scene image includes an image representing various parameters regarding the player character 31. Specifically, the interaction scene image includes a level image 41, a ticket image 42, and a currency image 43. It should be noted that the images 41 to 43 are also included in other game images (see FIGS. 6, 7, 9, and 11) representing other scenes different from the interaction scene.

The level image 41 indicates a player level, which is the current level of the player character (in other words, the level of the player). Although the details will be described later, the player level increases in accordance with the degree of intimacy with each animal character.

The ticket image 42 indicates the number of tickets owned by the player character (in other words, the player). A ticket is a type of an item that can be owned by the player character 31. The player can acquire a ticket in the game in exchange for a charging process (i.e., by paying a real fee). Although the details will be described later, a ticket is used by the player to give various instructions to advantageously advance the game.

The currency image indicates the amount of currency owned by the player character (in other words, the player) in the game. Although the details will be described later, in the exemplary embodiment, currency is used to create a piece of furniture.

In the exemplary embodiment, in the interaction state, the player can give three types of instructions, namely a conversation instruction, a quest instruction, and an invitation start instruction. As shown in FIG. 5, the interaction scene image includes a conversation instruction image 44 for giving the conversation instruction, a quest instruction image 45 for giving the quest instruction, and an invitation start instruction image 46 for giving the invitation start instruction. Further, the interaction scene image includes an end instruction image 47 for giving an instruction to end the display of the interaction scene image. For example, the player performs the operation of touching the position of any of the images 44 to 47 on the screen of the display section 24, and thereby can give the instruction corresponding to the touched image.

It should be noted that in another exemplary embodiment, the content of an interaction action between the player character 31 and the animal character 32 is optional. For example, in another exemplary embodiment, the interaction action may be an action in which the player character 31 and the animal character 32 pass each other in the game space, or may be an action in which the player character 31 and the animal character 32 stay in the same area (or one of the characters visits an area where the other character is placed). At this time, in accordance with the fact that the player character 31 and the animal character 32 pass each other (or the fact that the player character 31 and the animal character 32 are present in the same area), the degree of intimacy regarding this animal character 32 may increase.

[2-2-1. Conversation Action]

In accordance with the fact that the above conversation instruction is given by the player, the player character 31 converses with the animal character 32. The content of the conversation is optional. For example, the information processing apparatus 2 causes the animal character 32 to hold a conversation corresponding to the type of the animal character, the degree of intimacy between the player character 31 and the animal character, time in the game, and the like. It should be noted that the interaction scene image includes a conversation field 48, and the information processing apparatus 2 displays the content of the conversation in the conversation field 48.

When the player character 31 and the animal character 32 converse with each other (in other words, in accordance with the fact that the operation of holding a conversation is performed on the animal character 32), the information processing apparatus 2 increases the degree of intimacy regarding this animal character 32. Here, in the exemplary embodiment, the information processing apparatus 2 manages two types of parameters, namely degree-of-intimacy points and a degree-of-intimacy level, as parameters indicating the degree of intimacy. Both the degree-of-intimacy points and the degree-of-intimacy level are numerical values indicating the intimacy between the player character 31 and the animal character 32 and are set with respect to each animal character. Specifically, when a conversation is held, the information processing apparatus 2 increases the degree-of-intimacy points by a predetermined amount. It should be noted that the amount of increase in the degree-of-intimacy points may change based on the content of the conversation. Further, every time the degree-of-intimacy points increase by a predetermined value, the information processing apparatus 2 increases the degree-of-intimacy level by 1. It should be noted that the degree-of-intimacy points necessary to increase the degree-of-intimacy level by 1 may be set such that the higher the degree-of-intimacy level, the greater the degree-of-intimacy points. Further, in another exemplary embodiment, parameters indicating the degree of intimacy are optional, and only a single type of a parameter may be managed.

It should be noted that in the exemplary embodiment, the information processing apparatus 2 sets an upper limit on the degree-of-intimacy points that can be increased a day in time in the game. That is, even when the player character 31 performs an interaction action on a certain animal character multiple times a day, the degree-of-intimacy points do not increase in accordance with interaction actions performed for a certain time or more. It should be noted that the method for setting an upper limit on the degree-of-intimacy points is optional. For example, in another exemplary embodiment, the information processing apparatus 2 may set an upper limit on the number of times an interaction action can be performed by the player character 31 a day in time in the game, thereby indirectly setting an upper limit on the degree-of-intimacy points. It should be noted that in another exemplary embodiment, in accordance with the fact that the player character 31 uses the above ticket, the information processing apparatus 2 may increase the upper limit of the degree-of-intimacy points or remove the upper limit.

Further, in the exemplary embodiment, the player level is determined in accordance with the total value of the degree-of-intimacy points corresponding to each animal character. That is, every time the total value increases by a predetermined value, the information processing apparatus 2 increases the player level by 1. It should be noted that the total value of the degree-of-intimacy points necessary to increase the player level by 1 may be set such that the higher the player level, the greater the total value.

[2-2-2. Action Regarding Quest]

In accordance with the fact that the above quest instruction is given by the player, the player character 31 performs an action regarding a quest corresponding to the animal character 32. Here, when the player character 31 does not accept a quest from the animal character 32, then in accordance with the quest instruction, the player character 31 accepts a quest from the animal character 32. That is, in accordance with the quest instruction, first, the animal character 32 requests the player character 31 to perform a quest. At this time, the information processing apparatus 2 displays the content of the quest (e.g., the line "Please bring me three fruits") in the conversation field 48 and receives an instruction to determine whether or not to accept the quest. The player gives an instruction to determine whether or not to accept the quest. In accordance with an instruction to accept the quest, the information processing apparatus 2 performs the process of setting the accepted quest for the player character 31. When, on the other hand, an instruction not to accept the quest is given, the information processing apparatus 2 does not perform the process of setting the quest for the player character 31.

It should be noted that in another exemplary embodiment, the quest may not need to be set to the state where the quest is accepted under the condition of a conversation with the animal character 32, and may be set to the state where the quest is accepted under another condition. For example, in another exemplary embodiment, in accordance with the fact that the animal character 32 appears, the information processing apparatus 2 may set the quest regarding the animal character 32 to the state where the quest is accepted. At this time, the player cannot learn the content of the quest by the animal character 32 merely appearing. Thus, the information processing apparatus 2 may allow the player to learn the content of the quest based on, for example, a conversation between the player character 31 and the animal character 32. Alternatively, for example, the information processing apparatus 2 may present, to the player in a menu image, the content of the quest regarding the animal character 32 that is currently appearing.

Although the content of the quest is optional, in the exemplary embodiment, the quest is the collection of specified resources. Here, resources (e.g., fruits, insects, fish, and the like) are placed in the game space, and the player character 31 can move in the game space and gain a resource specified in the quest. It should be noted that in accordance with the fact that the player character 31 uses the above ticket, the information processing apparatus 2 may make it easy for the player character 31 to fulfill the quest. For example, the information processing apparatus 2 may change a condition for fulfilling the quest, or make it easy to obtain a resource necessary to fulfill the quest.

Further, the method for determining a quest to be presented to the player character 31 is optional. For example, the information processing apparatus 2 may randomly select a quest from among a plurality of types of quests prepared in advance. Further, for example, in accordance with the player level and/or the degree of intimacy corresponding to the animal character, the information processing apparatus 2 may determine a quest to be presented. Specifically, a quest to be presented may be set such that the higher the player level and/or the degree of intimacy, the higher the level of difficulty of the quest to be presented (or the more likely the quest is presented).

When, on the other hand, the player character 31 has already accepted a quest from the animal character 32, then in accordance with the quest instruction, the player character 31 reports the fulfillment of the quest. In the above case, when the player character 31 owns the resource specified in the quest, the player character 31 performs the action of handing the resource to the animal character 32. As a result, the quest is fulfilled. In the above case, on the other hand, when the player character 31 does not own the resource specified in the quest, the quest is not fulfilled.

When the quest is fulfilled, the information processing apparatus 2 increases the degree-of-intimacy points as a reward in the game for the player. It should be noted that the magnitude of the degree-of-intimacy points to be increased may be set in accordance with the fulfilled quest, or may be a fixed value.

Further, when the quest is fulfilled, the information processing apparatus 2 gives a material and currency to the player character 31 as a reward in the game for the player. Specifically, in accordance with the fact that the fulfillment of the quest is reported, the information processing apparatus 2 causes the animal character 32 to perform the action of giving the material and the currency to the player character 31. Here, the material is a type of an item that can be owned by the player character 31, and is an item of a type used to create a piece of furniture. It can be said that a parameter indicating the number of materials is a parameter associated with the player. Further, when a piece of furniture is created using a material, a parameter indicating the number of pieces of furniture is changed under the condition that the value of the parameter indicating the number of materials is changed by a predetermined value. It should be noted that the amount of a material and the amount of currency to be given when a quest is fulfilled may be set in accordance with the fulfilled quest, or may be fixed values. Further, the type of a material to be given when a quest is fulfilled may be set in accordance with the fulfilled quest, or may be randomly set.

Based on the type of the animal character having requested the quest, the information processing apparatus 2 may determine the type of a resource to be given in accordance with the fulfillment of the quest. For example, when the animal character having requested the quest belongs to a particular species, the information processing apparatus 2 may give a resource of a particular type to the player character 31. Further, based on a probability, the information processing apparatus 2 may determine a resource to be given. At this time, when the animal character having requested the quest belongs to a particular species, the information processing apparatus 2 may set the probability of a resource of a particular type being given to be high (higher than the probability of another resource being given). It should be noted that the resource of the particular type may be a resource used to create a piece of furniture as a condition for inviting the animal character having requested the quest to the campground. According to this, by fulfilling a quest corresponding to a certain animal character, it is easier to invite this animal character to the campground. Thus, it is easy for the player to understand which animal character should request a quest and the player should fulfill the quest so that the player can invite a desired animal character to the campground.

It should be noted that in the exemplary embodiment, the information processing apparatus 2 sets an upper limit on the number of times a quest can be accepted a day in time in the game. That is, there is an upper limit on the number of times a quest can be accepted from a single animal character a day. However, in accordance with the fact that the player character 31 uses the above ticket, the information processing apparatus 2 may reset the number of times a quest is accepted a day, or may increase the upper limit, or may remove the upper limit. According to this, the player can advantageously advance the game using the ticket. It should be noted that the information processing apparatus 2 may allow the player to use the above ticket only for a quest regarding a particular animal character among a plurality of animal characters that can appear in the game space.

Figure 9:
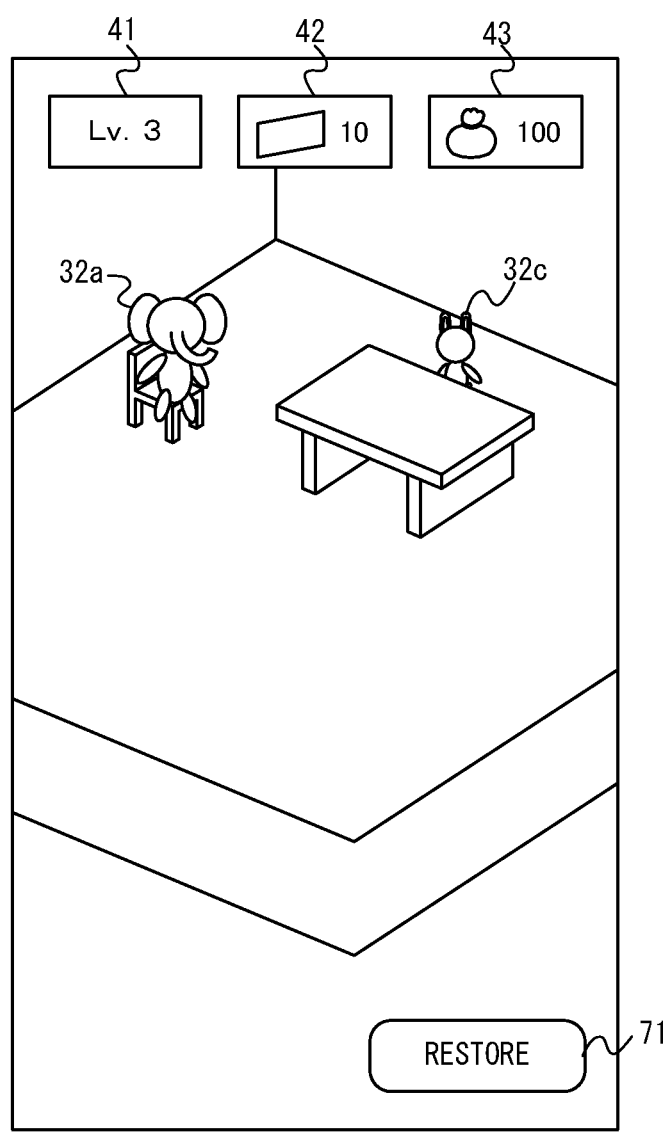
FIG. 9 is a diagram showing a non-limiting example of a campground image.

When an end instruction is given in the interaction state, the information processing apparatus 2 ends the display of the interaction scene image, and for example, displays on the display section 24 an image representing the game space including the player character 31 (e.g., FIG. 9). It should be noted that a description will be given later of actions when the invitation start instruction is given in the interaction state.

[2-3. Creation of Piece of Furniture]

Next, a description is given of the process of creating a piece of furniture in the above (Procedure 2). The player character 31 can create a piece of furniture using the material and the currency gained in the above (Procedure 1). The piece of furniture is a type of an item that can be owned by the player character 31, and is an item of a type used to invite the animal character to the campground. In the exemplary embodiment, for example, in accordance with an instruction given by the player, a menu image is displayed on the display section 24, and in accordance with the fact that a furniture creation instruction is given in the state where the menu image is displayed, the information processing apparatus 2 starts executing the process of creating a piece of furniture.

When the furniture creation instruction is given, the information processing apparatus 2 displays on the display section 24 an image representing a list of pieces of furniture that can be created. Then, the information processing apparatus 2 receives an instruction to specify a piece of furniture to be created. When the player gives an instruction to specify a piece of furniture (e.g., performs the operation of touching any of the displayed pieces of furniture), the information processing apparatus 2 displays on the display section 24 a furniture creation image regarding the specified piece of furniture. It should be noted that the types of pieces of furniture that can be created by the player character 31 may be increased in accordance with the above player level.

Figure 6:
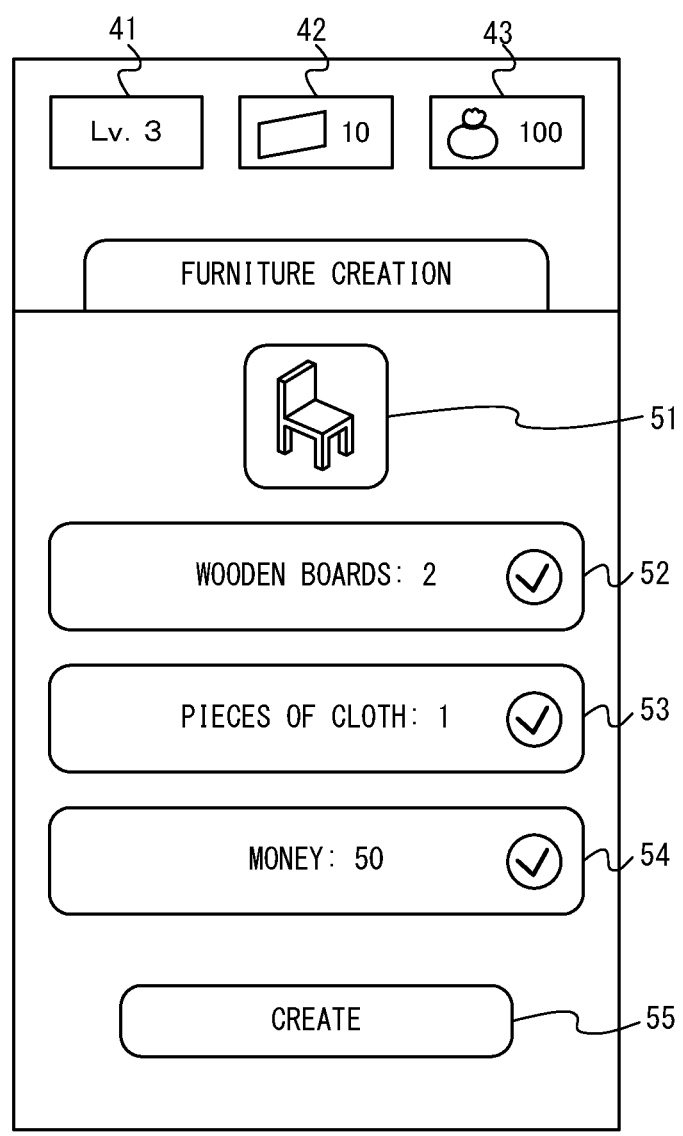
FIG. 6 is a diagram showing a non-limiting example of a furniture creation image.

FIG. 6 is a diagram showing an example of the furniture creation image. The furniture creation image represents materials and currency necessary to create the piece of furniture to be created. Specifically, as shown in FIG. 6, the furniture creation image includes a furniture image 51, material images 52 and 53, and a currency image 54. The furniture image 51 represents the piece of furniture to be created. The material images 52 and 53 indicate the types and the number of materials necessary to create the piece of furniture. It should be noted that in the example shown in FIG. 6, the number of the types of materials necessary to create the piece of furniture (specifically, a chair) represented by the furniture image 51 is two. Alternatively, the number of the types of materials necessary to create a piece of furniture may be any number. The currency image 54 indicates the amount of currency necessary to create the piece of furniture. It should be noted that in the exemplary embodiment, the types and the number of materials and the amount of currency necessary to create a piece of furniture are set with respect to each piece of furniture.

In the exemplary embodiment, when the player owns a material or currency necessary to create a piece of furniture, a material image indicating the material or a currency image includes a predetermined mark (a check mark in FIG. 6). Consequently, it is possible to notify the player of an element insufficient for creating the piece of furniture in an easily understandable manner. It should be noted that in another exemplary embodiment, to create a piece of furniture, another element (e.g., a resource) may be necessary, or a material or currency may not be necessary.

Further, as shown in FIG. 6, the furniture creation image includes a creation instruction image 55 for giving a creation instruction. For example, the player can give the creation instruction by performing the operation of touching the position of the creation instruction image 55 on the screen of the display section 24. It should be noted that when the piece of furniture can be created (i.e., when the player character 31 owns materials and currency necessary to create the piece of furniture), the information processing apparatus 2 may display the creation instruction image 55 and receive the creation instruction. When the piece of furniture cannot be created, the information processing apparatus 2 may not display the creation instruction image 55 and receive the creation instruction. Further, in another exemplary embodiment, in accordance with the fact that the player character 31 uses the above ticket, the information processing apparatus 2 may allow the player to make up for an insufficient material and create the piece of furniture.

When the creation instruction is given by the player, the information processing apparatus 2 creates the piece of furniture. Specifically, the information processing apparatus 2 updates data regarding the player character 31 so that the player character 31 owns the piece of furniture. Further, the information processing apparatus 2 updates the data regarding the player character 31 so as to delete (in other words, subtract) the material and the currency used to create the piece of furniture from the materials and the currency owned by the player character 31.

As described above, based on the fact that a conversation and an action regarding a quest are performed between the player character 31 and the animal character, the information processing apparatus 2 creates a piece of furniture (i.e., increases pieces of furniture owned by the player character 31). Consequently, in serial game play for creating the piece of furniture, it is possible to cause the player to have affection for the animal character. Here, in the exemplary embodiment, the information processing apparatus 2 manages two types of items (i.e., a material and a piece of furniture) owned by the player character 31 and creates a piece of furniture in exchange for a material (i.e., increases the number of pieces of furniture under the condition that the number of materials is reduced). According to this, it is possible to improve the level of strategy for creating a piece of furniture as compared with a case where a piece of furniture is simply created from a material. It should be noted that in another exemplary embodiment, a piece of furniture may be acquired not only by a conversation and an action regarding a quest, but also by another method (e.g., by being given as a privilege item described later).

In the exemplary embodiment, it takes some time to create the piece of furniture. That is, after a predetermined time elapses since the creation instruction is given, the information processing apparatus 2 enters the state where the player character 31 owns the piece of furniture. It should be noted that the time until the piece of furniture is completed may differ with respect to each piece of furniture, or may be the same with respect to each piece of furniture. It should be noted that in accordance with the fact that the player character 31 uses the above ticket, the information processing apparatus 2 may shorten the time until the piece of furniture is completed, or may immediately complete the piece of furniture.

(Objet)

It should be noted that in the exemplary embodiment, the player character 31 can create an objet as well as a piece of furniture using a material. The objet is a type of an item that can be created by the player character 31, and is an item of a type used to increase the degree of intimacy with the animal character. It should be noted that the method for creating the objet is similar to the method for creating the piece of furniture.

The objet is created to hold an event of an unveiling ceremony where animal characters are gathered. The objet is placed in the campground. Similarly to the piece of furniture, it also takes some time from when the creation instruction is given to when the objet is completed. Here, the objet is displayed in a form in which the external appearance of the objet cannot be recognized while being created (e.g., a form in which a sheet is placed over the objet). Then, after the objet is completed, and in accordance with the fact that an event instruction is given by the player, the objet is displayed in a form in which the external appearance of the objet can be recognized. It should be noted that the event instruction is an instruction to start the event of the unveiling ceremony. When the event instruction is given, the information processing apparatus 2 gathers, around the objet in the campground, animal characters placed in the game space (i.e., the normal areas and the campground) (i.e., causes the animal characters to move to around the objet) at the time when the event instruction is given. It should be noted that the animal characters to be gathered around the objet may be all of the animal characters placed in the game space at the time when the event instruction is given, or may be animal characters satisfying a predetermined condition (e.g., animal characters selected by the player) among the animal characters. In accordance with the fact that the objet is displayed in a form in which the external appearance of the objet can be recognized, the information processing apparatus 2 executes the event of the unveiling ceremony by causing each animal character to perform the action of celebrating the completion of the objet. Further, the information processing apparatus 2 increases the degree of intimacy regarding each animal character participating in the event of the unveiling ceremony. As described above, the player creates an objet in the campground and thereby can generate an event where the degrees of intimacy regarding a plurality of animal characters are increased at a time.

[2-4. Invitation of Animal Character]

Next, a description is given of the process of inviting the animal character to the campground in the above (Procedure 3). When the degree of intimacy with the animal character is increased in the above (Procedure 1), and the piece of furniture necessary to invite the animal character in the above (Procedure 2) is created, the player character 31 enters the state where the player character 31 can invite the animal character to the campground. In this state, the player character 31 and the animal character are brought into the above interaction state, whereby it is possible to give the invitation start instruction. It should be noted that in another exemplary embodiment, the timing when the player character 31 can invite the animal character is optional, and is not limited to the interaction state. For example, the information processing apparatus 2 may receive on the menu image the invitation start instruction and an instruction to specify the animal character to be invited.

As shown in FIG. 5, the interaction scene image includes the invitation start instruction image 46, and the information processing apparatus 2 receives the invitation start instruction in the interaction state. Then, when the invitation start instruction is given by the player, the information processing apparatus 2 displays an invitation condition image on the display section 24.

Figure 7:
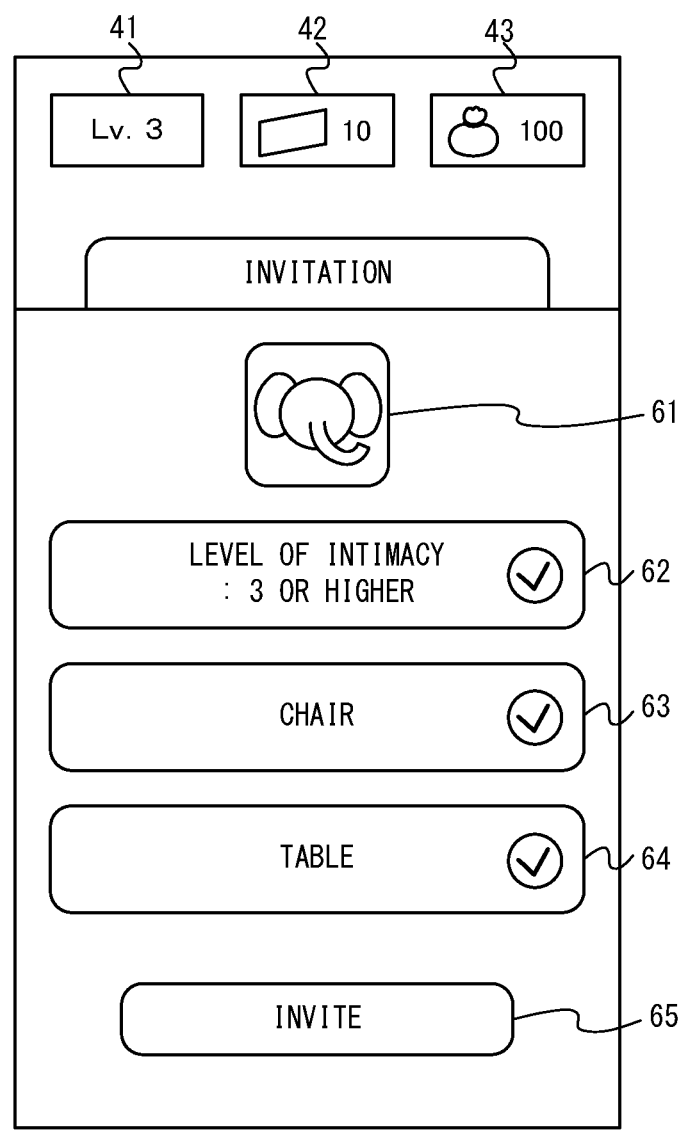
FIG. 7 is a diagram showing a non-limiting example of an invitation condition image.

FIG. 7 is a diagram showing an example of the invitation condition image. The invitation condition image represents a condition for inviting an animal character as a target to be invited (referred to as an "invitation condition"). Specifically, as shown in FIG. 7, the invitation condition image includes an invitation character image 61 and partial invitation condition images 62 to 64. The invitation character image 61 represents the animal character as the target to be invited (referred to as an "invitation target character"). It should be noted that in the exemplary embodiment, the invitation target character is the animal character that has been in the interaction state in the interaction scene image displayed immediately before the invitation condition image is displayed.

The partial invitation condition images 62 to 64 indicate conditions (referred to as "partial invitation conditions") included in the invitation condition. That is, it can be said that the invitation condition is "to satisfy the partial invitation conditions". In the example shown in FIG. 7, the partial invitation condition image 62 indicates a partial invitation condition regarding the degree of intimacy. The partial invitation condition images 63 and 64 each indicate a partial invitation condition regarding a piece of furniture. It should be noted that in the exemplary embodiment, the partial invitation condition regarding the piece of furniture is to place the piece of furniture in the campground. In the example shown in FIG. 7, three partial invitation conditions are included in the invitation condition. However, the number of partial invitation conditions included in the invitation condition may be any number.

In the exemplary embodiment, when a partial invitation condition is satisfied, a partial invitation condition image indicating the partial invitation condition includes a predetermined mark (a check mark in FIG. 7). Consequently, it is possible to notify the player of a partial invitation condition that is not satisfied in the invitation condition in an easily understandable manner.

It should be noted that as described above, in the exemplary embodiment, a partial invitation condition regarding a piece of furniture is to place the piece of furniture in the campground. Meanwhile, the operation of placing the piece of furniture in the campground is performed after the invitation condition image is displayed. Thus, at the time when the invitation condition image is displayed, the pieces of furniture may not need to be placed in the campground. At this time, when the player character 31 owns the piece of furniture (in other words, the piece of furniture can be placed in the campground), the information processing apparatus 2 determines that the partial invitation condition can be satisfied. Then, the information processing apparatus 2 displays the partial invitation condition image including the above mark. It should be noted that in another exemplary embodiment, before receiving the invitation start instruction, the information processing apparatus 2 may receive the operation of placing the piece of furniture in the campground at any timing (e.g., in the state where the menu image is displayed). That is, before the player gives the invitation start instruction, the piece of furniture may be able to be placed in advance in the campground.

FIG. 8 is a diagram showing an example of the invitation condition set with respect to each animal character. The information processing apparatus 2 (and/or the server 1) stores invitation condition data indicating the association between each animal character and the invitation condition as shown in FIG. 8 (see FIG. 12). Specifically, the invitation condition data indicates, regarding each animal character that appears in the game, the association between the animal character and the invitation condition for inviting the animal character. Further, as shown in FIG. 8, in the exemplary embodiment, the invitation condition includes the partial invitation condition regarding the degree of intimacy (more specifically, the degree-of-intimacy level) and the partial invitation condition regarding a piece of furniture. It should be noted that in the exemplary embodiment, the invitation condition includes at least one partial invitation condition regarding the degree of intimacy and at least one partial invitation condition regarding a piece of furniture. In another exemplary embodiment, the invitation condition may include another partial invitation condition (e.g., a condition regarding a resource) different from the conditions regarding the degree of intimacy and a piece of furniture, or may not include the partial invitation conditions regarding the degree of intimacy and a piece of furniture.

Here, the degree of intimacy is a parameter set with respect to each animal character. On the other hand, it can be said that a piece of furniture is a parameter associated with the player (in other words, the player character 31) and independent of the type of an animal character (in other words, unrelated to the type of an animal character). That is, in the exemplary embodiment, the invitation condition includes a partial invitation condition regarding a parameter set with respect to each animal character (the degree of intimacy), and a partial invitation condition regarding a parameter associated with the player and independent of the type of an animal character. As described above, in the exemplary embodiment, the invitation condition including two different types of partial invitation conditions is used. Thus, to invite an animal character to the campground, the player plays the game so as to satisfy the invitation condition, taking into account both a parameter set with respect to the animal character and a parameter set regardless of the animal character. Consequently, it is possible to improve the level of strategy of the game regarding the invitation of an animal character to the campground.

Further, as shown in FIG. 7, the invitation condition image includes an invitation instruction image 65 for giving an invitation instruction. For example, the player can give the invitation instruction by performing the operation of touching the position of the invitation instruction image 65 on the screen of the display section 24. It should be noted that when the invitation target character can be invited (i.e., when all the partial invitation conditions are satisfied), the information processing apparatus 2 may display the invitation instruction image 65 and receive the invitation instruction. When the invitation target character cannot be invited, the information processing apparatus 2 may not display the invitation instruction image 65 and receive the invitation instruction.

When the invitation instruction is given by the player, the information processing apparatus 2 advances the process of inviting the invitation target character to the campground. Here, in the exemplary embodiment, to invite an animal character that has not been invited to the campground, the information processing apparatus 2 receives a furniture placement instruction to place a piece of furniture regarding the invitation condition in the campground. That is, in the exemplary embodiment, the invitation condition includes a partial invitation condition "to place a piece of furniture in the campground". Then, under the condition that a piece of furniture is placed in the campground, the player is permitted to place the animal character in the campground. According to this, the player can customize the campground also regarding the placement of a piece of furniture. Thus, the player can have affection not only for the animal character but also for the campground itself or the piece of furniture to be placed in the campground. Consequently, it is possible to improve the interest of the game.

It should be noted that to invite an animal character to the campground again (i.e., invite an animal character that has been invited to the campground), the information processing apparatus 2 places the invitation target character in the campground without receiving the furniture placement instruction. That is, the information processing apparatus 2 places in the campground an animal character that the player is permitted to invite to the campground (and that is not placed in the campground) in accordance with the invitation instruction, regardless of whether or not the invitation condition is satisfied at the time when the invitation instruction is given. As described above, in the exemplary embodiment, to invite an animal character again, the invitation condition does not need to be satisfied at the time when the player invites the animal character again. According to this, it is possible to simplify a game operation to be performed to invite an animal character again. Thus, it is possible to improve the convenience for the player.

In the exemplary embodiment, the information processing apparatus 2 receives, as the above furniture placement instruction, a manual placement instruction to place the piece of furniture by the player specifying the placement position, and an automatic placement instruction to place the piece of furniture without the player specifying the placement position. For example, the information processing apparatus 2 displays an image representing the manual placement instruction and an image representing the automatic placement instruction on the display section 24 and receives the operation of specifying either of the images. As described above, the player can perform both the operation of placing the piece of furniture by specifying the position themselves, and the operation of automatically placing the piece of furniture without specifying the position. When the manual placement instruction is given, then in accordance with an operation of the player, the information processing apparatus 2 determines the position where (and the direction in which) the piece of furniture is to be placed. When the automatic placement instruction is given, then automatically in accordance with a placement rule determined in advance in the game application (in other words, without the player specifying the placement position), the information processing apparatus 2 determines the position where (and the direction in which) the piece of furniture is to be placed.

As described above, in the exemplary embodiment, by giving the above manual placement instruction, the player can place the piece of furniture in accordance with the preference of the player themselves in the campground. As described above, in the exemplary embodiment, it is also possible to enjoy the game by placing a piece of furniture in accordance with the preference of the player in addition to the placement of a favorite animal character in the campground. Further, by giving the above automatic placement instruction, the player can omit the operation of placing the piece of furniture. Thus, it is possible to simply perform a series of operations for inviting an animal character.

When the piece of furniture is placed, the information processing apparatus 2 places the invitation target character in the campground. At this time, the information processing apparatus 2 displays on the display section 24 a campground image representing the state of the campground. It should be noted that the campground image can be displayed at a different timing from the timing when the invitation target character is placed in the campground. For example, the player can display the campground image by performing the operation of causing the player character 31 to move to the campground.

FIG. 9 is a diagram showing an example of the campground image. As shown in FIG. 9, the invited animal character and the pieces of furniture owned by the player character 31 are placed in the campground. When an animal character is newly invited by a series of processes for inviting an animal character, a piece of furniture placed by these processes and the newly invited animal character are newly placed in the campground.

It should be noted that in the exemplary embodiment, an upper limit is set on the number of animal characters that can be placed in the campground. In a case where as many animal characters as the above upper limit number are already placed in the campground at the time when a new invitation target character is invited, the information processing apparatus 2 does not place the new invitation target character in the campground at this time. Here, in the exemplary embodiment, in accordance with a leaving instruction given by the player, the information processing apparatus 2 causes the animal characters invited to and placed in the campground to leave the campground (the details will be described later). Thus, when as many animal characters as the upper limit number are already placed in the campground, and after the animal characters leave the campground (in accordance with the leaving instruction given by the player), the information processing apparatus 2 places the new invitation target character in the campground. It should be noted that in another exemplary embodiment, in the above case, the information processing apparatus 2 may replace the animal characters already placed in the campground with the new invitation target character, thereby placing the new invitation target character in the campground.

In the exemplary embodiment, the information processing apparatus 2 causes an animal character placed in the campground to perform an action on a piece of furniture corresponding to the animal character. It should be noted that "a piece of furniture corresponding to the animal character" is a piece of furniture included in the invitation condition for the animal character. In the example shown in FIG. 9, the animal character 32a performs the action of being seated on a chair, which is a piece of furniture corresponding to the animal character 32a. The action performed by the animal character on the piece of furniture is optional. For example, the action may be the action of lying on a bed, or may be the action of reading a book beside a bookshelf. As described above, an animal character is caused to perform an action on a piece of furniture created and placed by the player character 31, whereby it is possible to cause the player to feel affection for the animal character and the piece of furniture more strongly. Further, an animal character is caused to perform an action on a piece of furniture corresponding to the animal character, whereby it is possible to present to the player the correspondence relationship between an animal character and a piece of furniture necessary to invite the animal character in an easily understandable manner.

As shown in FIG. 9, the campground image includes a restoration instruction image 71 for giving a restoration instruction. For example, the player can give the restoration instruction by performing the operation of touching the position of the restoration instruction image 71 on the screen of the display section 24. In accordance with the above restoration instruction, the information processing apparatus 2 restores the placement of the piece of furniture changed to invite the animal character to the state before the change. Here, in the exemplary embodiment, in a series of operations performed when inviting an animal character, it is necessary to place a piece of furniture corresponding to the animal character. Thus, there is a possibility that the player places the piece of furniture in placement different from the preference of the player to invite the animal character. Regarding this, in the exemplary embodiment, the information processing apparatus 2 receives the above restoration instruction in the state where the campground image is displayed after the animal character is invited, the player can easily restore the placement of the piece of furniture to the placement before the animal character is invited. It should be noted that in another exemplary embodiment, when the piece of furniture is placed based on the above automatic placement instruction, the information processing apparatus 2 may receive the restoration instruction. When the piece of furniture is placed based on the above manual placement instruction, the information processing apparatus 2 may not receive the restoration instruction.

Further, in the exemplary embodiment, to invite an animal character that has not been invited to the campground, it is necessary to place a piece of furniture so as to satisfy the invitation condition. Meanwhile, to invite the animal character again after the animal character is invited once, it is not necessary to satisfy the invitation condition at the time when the player invites the animal character again. Thus, in the exemplary embodiment, the player can invite a favorite animal character to the campground while freely placing a piece of furniture without the restriction of an animal character.

As described above, in the exemplary embodiment, the player can place a favorite animal character in (in other words, invites the favorite animal character to) an area of the campground and enjoy an interaction with an animal character for which the player has affection at any time. It should be noted that by placing an animal character in the campground, for example, it is possible to increase the total number of animal characters placed in the game space (specifically, the sum of the number of animal characters placed in the normal areas and the number of animal characters placed in the campground). Thus, there is also an advantage that it is possible to cause the player character 31 and animal characters to efficiently interact with each other. Further, by causing the player character 31 and the animal characters to efficiently interact with each other, there is also an advantage that it is possible to efficiently increase the degrees of intimacy and gain materials.

Further, in the exemplary embodiment, in accordance with the fact that an animal character placed in a virtual space satisfies a predetermined condition, specifically, in accordance with the fact that the player character 31 and the animal character perform a predetermined action (i.e., a conversation or an action regarding a quest) with each other, the information processing apparatus 2 changes the degree of intimacy associated with the animal character. In other words, in accordance with the fact that an operation by the player (i.e., the operation of giving a conversation instruction or a quest instruction) is performed on the animal character, the information processing apparatus 2 changes the degree of intimacy associated with the animal character. Thus, in the exemplary embodiment, by game play for inviting an animal character to the campground, the player can have affection for the animal character. That is, in the exemplary embodiment, before an animal character is invited to the campground, the information processing apparatus 2 can cause the player to have affection for the animal character. In the exemplary embodiment, an animal character for which the player has affection is invited to the campground. Thus, a sense of fulfillment and/or a sense of satisfaction of the player when the invitation of the animal character to the campground is successful are greater than in a case where the player invites an animal character for which the player does not have affection. Thus, according to the exemplary embodiment, it is possible to improve the interest of the game when the invitation of an animal character to the campground is successful.

It should be noted that in another exemplary embodiment, in accordance with the type of the action of the player character 31 performed on the animal character 32, the information processing apparatus 2 may increase and/or decrease the degree of intimacy. For example, when the player character 31 performs a friendly action on the animal character 32 (e.g., holds a conversation in which the player character 31 praises the animal character 32 in a conversation action), the information processing apparatus 2 increases the degree of intimacy associated with the animal character. When, on the other hand, the player character 31 performs an unfriendly action on the animal character 32 (e.g., holds a conversation in which the player character 31 dispraises the animal character 32 in a conversation action), the information processing apparatus 2 reduces the degree of intimacy associated with the animal character.

It should be noted that in the exemplary embodiment, animal characters that can be invited by the player are animal characters that can be placed in the game space at the current moment (placeable characters described later). Although the details will be described later, the number of placeable characters increases in accordance with an increase in the player level. Here, in another exemplary embodiment, in accordance with an increase in the number of animal characters invited to the campground, the information processing apparatus 2 may increase the number of animal characters that can be invited to the campground (or the number of placeable characters). According to this, it is possible to give the player the motivation to invite an animal character to the campground more strongly.

[2-5. Placement Management of Animal Characters]

Figure 10:
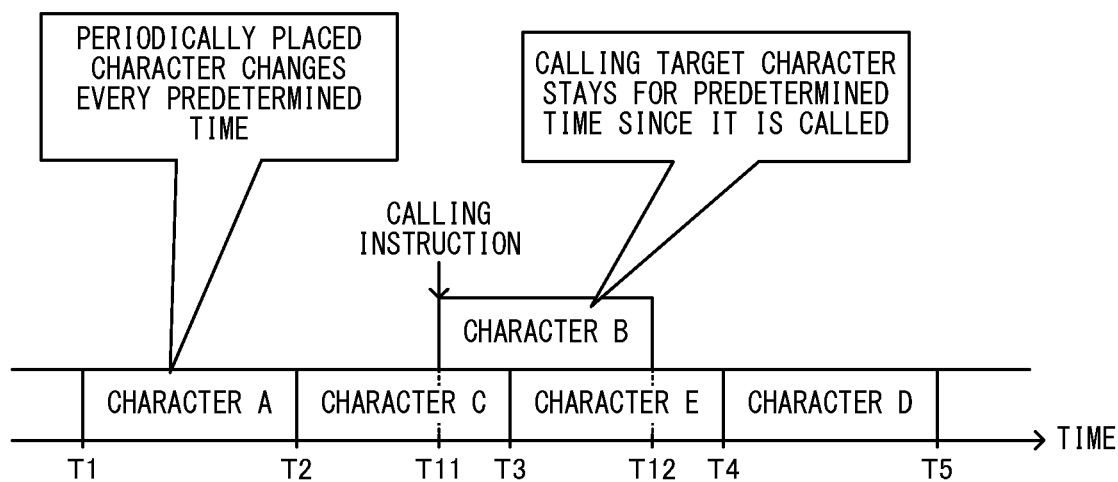
FIG. 10 is a diagram showing a non-limiting example of the state where the placement states of animal characters in a normal area change.
Figure 11:
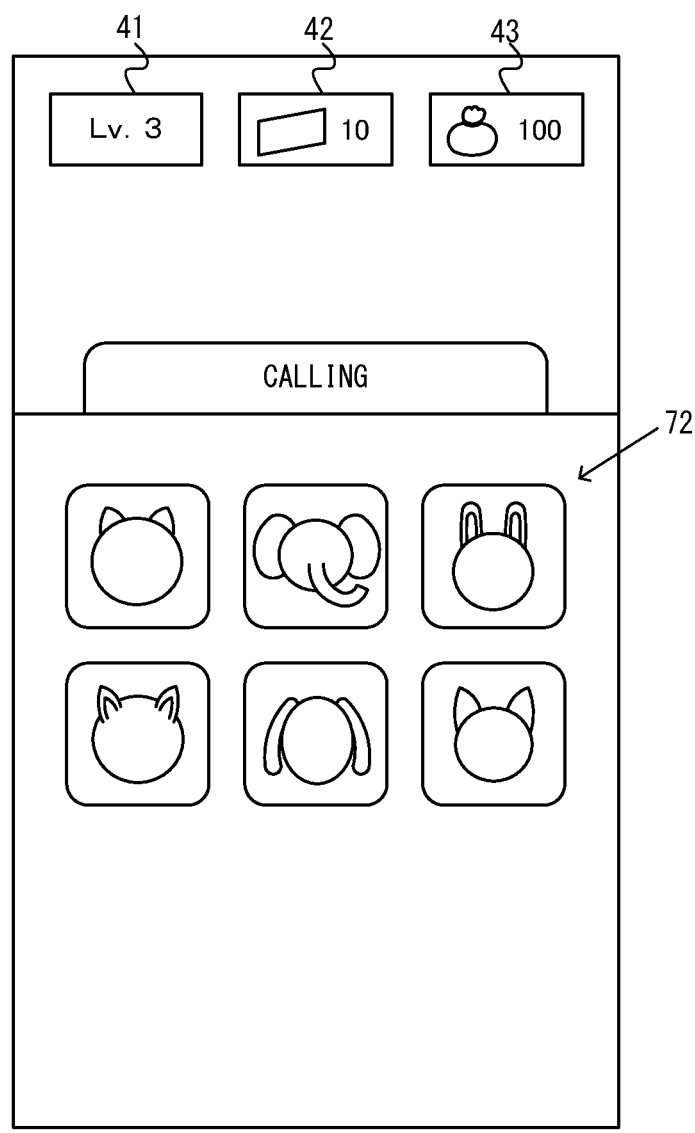
FIG. 11 is a diagram showing a non-limiting example of a calling image.

Next, with reference to FIGS. 10 and 11, a description is given of the process of managing the placement of animal characters in the normal areas. FIG. 10 is a diagram showing an example of the state where the placement states of the animal characters in the normal areas change. FIG. 10 shows an example of the state where an animal character placed in a certain single normal area changes in accordance with time. As shown in FIG. 10, the information processing apparatus 2 changes the placement states of the animal characters in the game space in accordance with time. Consequently, in the exemplary embodiment, it is possible to give the player the opportunities to view or interact with more types of animal characters. It should be noted that as described above, an animal character of which the placement state is changed in accordance with time is an animal character different from the invitation target character invited to the campground.

[2-5-1. Management of Periodically Placed Character]

In the exemplary embodiment, the information processing apparatus 2 places a predetermined number of (e.g., one) animal characters as periodically placed characters in each normal area. As shown in FIG. 10, the information processing apparatus 2 changes an animal character placed as a periodically placed character every predetermined time (hereinafter referred to as "staying time", e.g., three hours) in the game. In the example shown in FIG. 10, the periodically placed character placed in one of the normal areas changes in order of a character A, a character C, a character E, and a character D at periodic change timings T1 to T4 every staying time. It should be noted that in the exemplary embodiment, the information processing apparatus 2 places the periodically placed character in each normal area. Alternatively, in another exemplary embodiment, the information processing apparatus 2 may also place a periodically placed character in the campground. It should be noted that unlike an animal character invited to the campground, the placement state of the periodically placed character placed in the campground is changed in accordance with time.

Here, in the exemplary embodiment, the information processing apparatus 2 advances time in the game in accordance with the lapse of real time. More specifically, the information processing apparatus 2 advances time in the game so as to coincide with real time. It should be noted that in another exemplary embodiment, time in the game does not need to coincide with real time. For example, the information processing apparatus 2 may advance time in the game predetermined times as fast as the lapse of real time. Further, for example, while an image representing the virtual space is displayed in the game, the information processing apparatus 2 may advance time in the game in accordance with the lapse of real time. Then, while the menu image is displayed, the information processing apparatus 2 may stop time in the game. Further, for example, while the game program is executed, the information processing apparatus 2 may advance time in the game in accordance with the lapse of real time. Then, while the game program is not executed, the information processing apparatus 2 may stop time in the game. Further, in another exemplary embodiment, time in the game may not be advanced in accordance with the lapse of real time.

As described above, a periodically placed character appears in a normal area at a periodic change timing, stays for the above staying time, and then leaves the normal area (in other words, is erased from the game space). It should be noted that in the exemplary embodiment, the information processing apparatus 2 sets the same periodic change timing for each normal area. That is, in accordance with the fact that the periodic change timing arrives, the periodically placed character is changed in each normal area. In another exemplary embodiment, however, the information processing apparatus 2 may set a periodic change timing with respect to each normal area.

Further, as described above, a condition for changing the placement state of the periodically placed character is a condition repeatedly satisfied in accordance with the lapse of time in the game. According to this, the placement state of an animal character is repeatedly changed in accordance with the lapse of time. Thus, the player repeatedly plays the game or repeatedly starts the game application in order to confirm whether a favorite animal character is appearing. That is, according to the exemplary embodiment, it is possible to give the player the motivation to repeatedly use the game application. It should be noted that in the exemplary embodiment, the information processing apparatus 2 changes the placement state of the periodically placed character every predetermined time. Alternatively, in another exemplary embodiment, the information processing apparatus 2 may change the placement state of the periodically placed character every time a predetermined time arrives. For example, the placement state of the periodically placed character may be changed at appointed times (e.g., 0 o'clock, 6 o'clock, 12 o'clock, and 18 o'clock) every day, or may be changed at an appointed time on a predetermined day of the week (e.g., 6 o'clock on Monday). Further, in the exemplary embodiment, the placement state of the periodically placed character is changed at predetermined time intervals. Alternatively, in another exemplary embodiment, the placement state of the periodically placed character may be repeatedly changed at time intervals that are not constant. Further, the placement state of the periodically placed character may not be changed at a fixed time, and may be changed at any time in the period from 6 o'clock to 8 o'clock every day, for example.

At a periodic change timing, the information processing apparatus 2 determines a periodically placed character to be placed next. In the exemplary embodiment, a periodically placed character is selected from placeable characters among animal characters that appear in the game. Here, a placeable character is an animal character that can be placed as a periodically placed character in the game space. Thus, it can be said that a placeable character is an animal character that can be specified as a calling target character, and is an animal character that can be specified as an invitation target character. For example, the number of placeable characters is 30, and the number of periodically placed characters (i.e., the number of characters simultaneously placed as periodically placed characters in the game space) is four. It should be noted that in the exemplary embodiment, the information processing apparatus 2 increases the number of placeable characters in accordance with the player level. Thus, in the exemplary embodiment, there is an animal character that is not included in placeable characters and therefore does not appear in the game space in the state where the player level is low. There is also an animal character that is included in placeable characters and therefore appears in the game space when the player level becomes high.

The information processing apparatus 2 selects a periodically placed character from among placeable characters based on a probability (in other words, such that the selection has randomness). Here, "select a periodically placed character such that the selection has randomness" means not only randomly selecting a periodically placed character in a strict sense, but also selecting a periodically placed character based on a probability so that in multiple trials, the same selection result is not obtained each time.

Specifically, in the exemplary embodiment, in accordance with the following (Rule 1) to (Rule 3), the information processing apparatus 2 selects each periodically placed character to be placed in each normal area such that the selection has randomness.

(Rule 1) An animal character invited to the campground is not selected: This is because the state where the animal character is invited to the campground is canceled against the intention of the player.
(Rule 2) An animal character that has not yet appeared in the game space is more likely to be selected: The information processing apparatus 2 sets the probability that an animal character that has not yet appeared in the game space is selected, to be higher than the probability that an animal character that has appeared in the game space is selected. Consequently, it is possible to reduce animal characters that the player has not seen yet, and it is possible to inform the player of many types of animal characters.
(Rule 3) Animal characters of the same type are less likely to appear in each normal area: According to this, it is possible to reduce the possibility that deviation occurs in the types of animal characters simultaneously placed in each normal area. It should be noted that "animal characters of the same type" refer to, for example, animal characters in the state where any of various parameters (the species, the personality, and the like) set for the animal characters is of same type.

It should be noted that in the exemplary embodiment, a plurality of the same animal characters do not exist. Thus, the same animal character is not simultaneously placed in a plurality of areas. In another exemplary embodiment, however, the same animal character (or animal characters of the same type) may be simultaneously placed in a plurality of areas.

As described above, an animal character placed in a normal area is selected such that the selection has randomness. Thus, there can also be a case where an animal character placed in a normal area immediately before a periodic change timing happens to be placed in the same normal area as or a different normal area from the normal area immediately after the periodic change timing. That is, an animal character having left at a periodic change timing is placed again at the periodic change timing, whereby the animal character can also seem to continue appearing in a normal area (or move to another normal area).

Further, in another exemplary embodiment, with respect to each animal character, a rarity degree may be set, and a selection probability corresponding to the rarity degree may be set. For example, an animal character (a so-called rare character) of which the selection probability is lower than that of another animal character may exist. Further, in another exemplary embodiment, in accordance with the degree of intimacy of an animal character, the information processing apparatus 2 may change the selection probability. For example, the information processing apparatus 2 may set the selection probability such that the higher the degree of intimacy of the animal character, the lower the selection probability, thereby heightening the level of difficulty for increasing the degree of intimacy regarding the animal character. Further, for example, the information processing apparatus 2 may set the selection probability such that the higher the degree of intimacy of the animal character, the higher the selection probability, thereby making it more likely that an animal character estimated as a favorite animal character of the player (i.e., an animal character of which the degree of intimacy is high) appears.

[2-5-2. Management of Calling Target Character]

As described above, although a predetermined number of periodically placed characters are placed in the normal areas, each periodically placed character is selected such that the selection has randomness. Thus, a favorite animal character of the player is not necessarily always placed. Thus, there is a possibility that the player loses the motivation to continue the game because a favorite animal character does not easily appear in the game space. In response, in the exemplary embodiment, the information processing apparatus 2 allows the player to call an animal character selected by the player to (in other words, cause the animal character to appear in) the game space. A description is given below of the management of an animal character to be called by the player (referred to as a "calling target character").

In the exemplary embodiment, to call an animal character to the game space, first, the player gives a calling start instruction. For example, in the state where the menu image is displayed in accordance with an instruction given by the player, the information processing apparatus 2 receives the calling start instruction. In accordance with the calling start instruction given by the player, the information processing apparatus 2 displays a calling image on the display section 24.

FIG. 11 is a diagram showing an example of the calling image. As shown in FIG. 11, the calling image includes a list image 72 representing a list of placeable characters. In the state where the list image 72 is displayed, the player gives a calling instruction to select an animal character to be called (specifically, the operation of touching an image of the animal character to be called). It should be noted that in the exemplary embodiment, when the player gives the calling instruction to select an animal character that is appearing in the game space at the current moment among the animal characters represented by the list image 72 (and therefore does not need to be called), the information processing apparatus 2 displays on the display section 24 a message indicating that this animal character cannot be called (in other words, does not need to be called). Further, in another exemplary embodiment, a mark may be assigned to an image of an animal character that can be selected by the player (i.e., an animal character placed in the game space at the current moment) among images of the animal characters included in the list image 72. This mark enables the player to easily distinguish between an animal character that is appearing in the game space at the current moment (and therefore does not need to be called) and an animal character that is not appearing in the game space at the current moment.

In the exemplary embodiment, under the condition that a predetermined item is consumed, the information processing apparatus 2 receives the calling instruction. Specifically, the player can give the calling instruction by consuming a predetermined number of (e.g., ten) tickets described above or consuming a predetermined number of (e.g., one) predetermined calling items. Here, a calling item is an item different from the above tickets and is an item to be given to the player not under the condition that a fee corresponding to a charging process is paid. The calling item is given to the player by, for example, satisfying a predetermined acquisition condition. The acquisition condition may be a condition regarding the game (e.g., that the player character 31 creates a predetermined piece of furniture or invites a predetermined animal character to the campground), or may be a condition regarding the use of the game application (e.g., that the player starts (or logs into) the game application three days in a row).

In the exemplary embodiment, when both the tickets and the calling item can be used to give the above calling instruction, the information processing apparatus 2 preferentially consumes the calling item. That is, when the condition for giving the calling instruction by consuming the calling item is satisfied, the information processing apparatus 2 consumes the calling item and receives the calling instruction, regardless of whether or not the condition for giving the calling instruction by consuming the tickets is satisfied (steps S63 and S64 described later). When, on the other hand, the condition for giving the calling instruction by consuming the tickets is satisfied, and the condition for giving the calling instruction by consuming the calling item is not satisfied, the information processing apparatus 2 consumes the tickets and receives the calling instruction (steps S66 and S67 described later).

Specifically, in accordance with the fact that the player gives the calling instruction, the information processing apparatus 2 displays on the display section 24 a message "Ten tickets will be used. Do you call this animal character?" when the tickets are consumed, or a message "One calling item will be used. Do you call this animal character?" when the calling item is consumed. When the player gives an instruction to agree to call the animal character (e.g., performs the operation of touching an image "Yes" displayed on the display section 24) in response to this, the information processing apparatus 2 executes the process of calling the calling target character.

It should be noted that in the exemplary embodiment, the tickets for calling an animal character are of a single type. Alternatively, in another exemplary embodiment, a plurality of types of tickets may be prepared. At this time, for example, an animal character that can be called using the tickets may be associated with each type of ticket. It should be noted that a single type of ticket may be associated with a plurality of types of animal characters or a single type of animal character.

As described above, in the exemplary embodiment, when the player gives the calling instruction, the information processing apparatus 2 consumes a free item (i.e., the calling item) in priority to a paid item (i.e., the tickets). Consequently, it is possible to make it easy for the player to give the calling instruction. Thus, it is possible to give the player the motivation to call more animal characters.

It should be noted that in the exemplary embodiment, a parameter as the condition for giving the calling instruction is a parameter indicating the number of items (more specifically, tickets or calling items). Alternatively, in another exemplary embodiment, a parameter as the condition for giving the calling instruction may be a parameter indicating the amount of currency to be used in the game, or may be a parameter indicating the stamina, an HP (hit point), or a MP (magic point) of the player character.

Further, in the exemplary embodiment, a parameter as the condition for giving the calling instruction is a parameter of a type that is reduced when the calling instruction is given (i.e., a parameter indicating the number of items to be consumed). Thus, the condition for giving the calling instruction is a condition satisfied when the parameter is equal to or greater than a predetermined value. Here, in another exemplary embodiment, a parameter as the condition for giving the calling instruction may be a parameter of a type that is increased when the calling instruction is given (e.g., a parameter indicating the degree of fatigue of the player character 31 or a parameter indicating the amount of debt of the player character 31). At this time, the condition for giving the calling instruction is a condition satisfied when the parameter is less than or equal to a predetermined value.

Further, in the exemplary embodiment, the tickets for giving the calling instruction can be purchased for a fee. Alternatively, in another exemplary embodiment, an item for changing a parameter for giving the calling instruction may be able to be purchased for a fee. For example, when the calling instruction is given by consuming the stamina of the player character, an item for recovering stamina may be able to be purchased for a fee. Further, in another exemplary embodiment, the calling instruction may be given for a fee. That is, in accordance with the fact that a predetermined fee is paid, the information processing apparatus 2 may receive the calling instruction.

In the exemplary embodiment, the types and the number of items (tickets or calling items described above) necessary to give the calling instruction are constant, regardless of the animal character as the calling target character. It should be noted that in another exemplary embodiment, the types and/or the number of items necessary to give the calling instruction may be set with respect to each animal character as the calling target character. For example, when the above rarity degree is set with respect to each animal character, the number of items necessary to call an animal character of which the rarity degree is high may be set to be greater than the number of items necessary to call an animal character of which the rarity degree is low. Specifically, the condition for giving the calling instruction regarding an animal character of which the rarity degree is low may be "that the number of items is equal to or greater than a first reference amount". The condition for giving the calling instruction regarding an animal character of which the rarity degree is high may be "that the number of items is equal to or greater than a second reference amount". It should be noted that at this time, the first reference amount is a value smaller than the second reference amount. Based on the above, it is possible to vary the level of difficulty for calling in accordance with the animal character. Thus, it is possible to further improve the level of strategy and the interest of the game.

When the information processing apparatus 2 receives the calling instruction, the information processing apparatus 2 places the calling target character (in other words, causes the calling target character to appear) in the game space. In the exemplary embodiment, the calling target character is placed at a position based on the position of the player character 31. Specifically, the calling target character is placed in an area (a normal area or the campground) where the player character 31 is currently placed. A specific position where the calling target character is placed in the area may be a position determined in advance in the area, or may be a position near the player character 31. Further, in another exemplary embodiment, the position where the calling target character is placed is optional, and the placement position may be randomly determined.

It should be noted that the timing when the calling target character is placed in the game space is optional, and may not be a timing corresponding to the calling instruction. For example, in another exemplary embodiment, after the information processing apparatus 2 receives the calling instruction, and at the timing when time in the game reaches a predetermined time, the calling target character may be placed in the game space. Further, for example, after the information processing apparatus 2 receives the calling instruction, and in accordance with the fact that the above periodic change timing arrives, the calling target character may be placed in the game space.

The calling target character is placed in the game space, whereby the player character 31 can perform an interaction action with the calling target character. Further, the calling target character is placed in an area where the player character 31 is present, whereby it is possible to simplify the operation of causing the player character 31 to move to the position of the calling target character.

Further, in the exemplary embodiment, when the calling target character is placed in the game space, the information processing apparatus 2 increases the degree-of-intimacy points regarding the calling target character as a reward in the game for the player. According to this, a reward is given to the player by merely calling the calling target character. Thus, it is possible to give the player the motivation to give the calling instruction. It should be noted that the magnitude of the degree-of-intimacy points to be increased may be constant, regardless of the calling target character, or may be set with respect to each calling target character.

In the exemplary embodiment, an upper limit is set on the number of animal characters that can be simultaneously called to a single normal area. Here, the upper limit is one character. Thus, a total of two characters, namely the above periodically placed character and the calling target character, can be simultaneously placed in a normal area. It should be noted that the upper limit number of animal characters that can be placed in a normal area may be any number, or the upper limit number may not be set.

In a case where the information processing apparatus 2 causes the calling target character to appear, and when the above staying time elapses since the appearance of the calling target character, the information processing apparatus 2 causes the calling target character to leave (in other words, erases the calling target character from the game space). For example, in the example shown in FIG. 10, a calling target character B that appears at a timing T11 stays until not a periodic change timing T3, which arrives after that, but a timing T12 when the staying time elapses since the appearance of the calling target character B. Then, the calling target character B leaves at the timing T12. This is because the calling instruction is given by the player at a timing unrelated to a periodic change timing, and therefore, if the calling target character leaves at the periodic change timing, there is a possibility that the period in which the calling target character is appearing is too short. For example, in the example shown in FIG. 10, if the calling target character that appears at the timing T11 leaves at the periodic change timing T3, the period in which the calling target character is appearing is too short. In response, in the exemplary embodiment, the calling target character is appearing until the above staying time elapses, regardless of the timing of the calling instruction. Thus, it is possible to equally give the player the opportunity to interact with the calling target character, regardless of the timing of the calling instruction.

It should be noted that the information processing apparatus 2 may notify the user of the time until animal characters (specifically, the periodically placed character and the calling target character) leave. For example, when the information processing apparatus 2 displays a map image of a single normal area on the display section 24, the information processing apparatus 2 may display, together with the map image on the display section 24, a remaining time image indicating animal characters placed in the normal area and the time until the animal characters leave. The remaining time image may be, for example, an image representing a message "10 minutes until the character A leaves" or "30 minutes until the character B leaves". According to this, the player can easily recognize the time until the animal characters leave.

As described above, in the exemplary embodiment, when a first time condition (i.e., the staying period elapses since the periodically placed character appears in accordance with the arrival of a periodic change timing) is satisfied, the information processing apparatus 2 further changes the placement state of the periodically placed character (i.e., erases the periodically placed character that has been placed up to this time). When, on the other hand, a second time condition (i.e., the staying time elapses since the calling target character appears in accordance with the calling instruction) different from the first time condition is satisfied, the information processing apparatus 2 further changes the placement state of the calling target character (i.e., erases the calling target character that has been placed). As described above, in the exemplary embodiment, the conditions for changing (specifically, erasing) the placement states of the periodically placed character and the calling target character are set to be different, whereby it is possible to reduce the possibility that the time in which the calling target character is placed is too short.

Further, in the exemplary embodiment, the first time condition is a condition regarding the time elapsed since a placement process for placing the periodically placed character is executed. The second time condition is a condition regarding the time elapsed since a placement process for placing the calling target character is executed. According to this, it is possible to control a change in the placement state of the calling target character, independently of a change in the placement state of the periodically placed character. Thus, it is possible to reduce the possibility that the time in which the calling target character is placed is too short. It should be noted that in the exemplary embodiment, the length of the period in which the periodically placed character stays in the game space is the same as the length of the period in which the calling target character stays in the game space (see FIG. 10). In another exemplary embodiment, however, the information processing apparatus 2 may set the period in which the calling target character stays in the game space to be longer or shorter than the period in which the periodically placed character stays in the game space.

It should be noted that in the exemplary embodiment, the placement of an animal character in each area of the game space means changing the placement state of the animal character so that predetermined actions on (specifically, a conversation and an action regarding a quest with) the animal character can be performed. It should be noted that in another exemplary embodiment, the game space may include an interaction prohibition area where the predetermined actions on an animal character cannot be performed. At this time, a change in the periodically placed character is a change in the placement state of an animal character in an area where the predetermined actions on an animal character can be performed. Placement corresponding to the calling instruction is the placement of the calling target character in an area where the predetermined actions on an animal character can be performed.

Further, until the first time condition is satisfied, the information processing apparatus 2 maintains the placement state of a placement change character where the predetermined actions on the placement change character can be performed. Until the second time condition is satisfied, the information processing apparatus 2 maintains the placement state of the calling target character where the predetermined actions on the calling target character can be performed. Thus, for example, when the game space includes the above interaction prohibition area, and in the period until the first time condition is satisfied, the information processing apparatus 2 controls the placement change character not to move to the interaction prohibition area. In the period until the second time condition is satisfied, the information processing apparatus 2 controls the calling target character not to move to the interaction prohibition area. According to this, it is possible to reduce the possibility that as a result of the fact that the calling target character is called and then moves to the interaction prohibition area, the player cannot interact with the calling target character even though the player gives the calling instruction. Thus, the player can perform an interaction action with an animal character more certainly.

[2-6. Other Processes]

The information processing apparatus 2 executes a leaving process and a ticket purchasing process in addition to the above various processes. In the state where the menu image is displayed in accordance with an instruction given by the player, these processes are executed in accordance with the fact that instructions to start the processes are given by the player.

The leaving process is the process of causing an animal character invited to and placed in the campground to leave. Specifically, the information processing apparatus 2 receives a leaving instruction to specify an animal character to be caused to leave. When the leaving instruction is given by the player, the information processing apparatus 2 causes the specified animal character to leave the campground (in other words, erases the specified animal character from the game space). For example, when the number of animal characters placed in the campground reaches the upper limit, it is possible to invite a new animal character to the campground by the leaving process. By the leaving process, the player can change an animal character to be placed in the campground more freely.

The ticket purchasing process is the process of purchasing tickets. Specifically, the information processing apparatus 2 receives a purchase instruction to specify the number of tickets to be purchased. When the purchase instruction is given by the player, the information processing apparatus 2 makes to the server 1 a purchase request to purchase the tickets. The server 1 executes a charging process for charging the player. It should be noted that the method for the server 1 to charge the player (in other words, the method for the player to purchase the tickets) is optional, and may be a method similar to a conventional method. The method for charging the player may be, for example, a method in which the player charges in advance the amount of money that can be used for payment in a service of this game application, and the server 1 subtracts a fee corresponding to the purchase of the tickets from the charged amount of money, or may be a method using credit card payment.

When the collection of the fee regarding the purchase of the tickets is completed, the server 1 transmits, to the information processing apparatus 2, ticket giving data indicating the tickets to be given. In accordance with the fact that the ticket giving data is received, the information processing apparatus 2 executes the process of giving the specified number of tickets to the player (step S95 described later). Based on the above, the player can purchase the specified number of tickets.

In another exemplary embodiment, in the state where the menu image is displayed, the player may be allowed to perform the operation of inviting an animal character to the campground. Specifically, in the menu image, the information processing apparatus 2 receives the above invitation start instruction and an instruction to specify an animal character to be invited. When the information processing apparatus 2 receives these instructions, the information processing apparatus 2 displays on the display section 24 an invitation condition image regarding the specified animal character. A process after the invitation condition image is displayed is similar to the process described in the above "[2-4. Invitation of Animal Character]". Consequently, the player can perform, also through the menu image, the operation of inviting an animal character.

3. Specific Examples of Processes by Apparatuses

Next, with reference to FIGS. 12 to 19, a description is given of specific examples of processes by the apparatuses (i.e., the server 1 and the information processing apparatus 2) included in the information processing system according to the exemplary embodiment.

[3-1. Process by Information Processing Apparatus 2]

Figure 12:
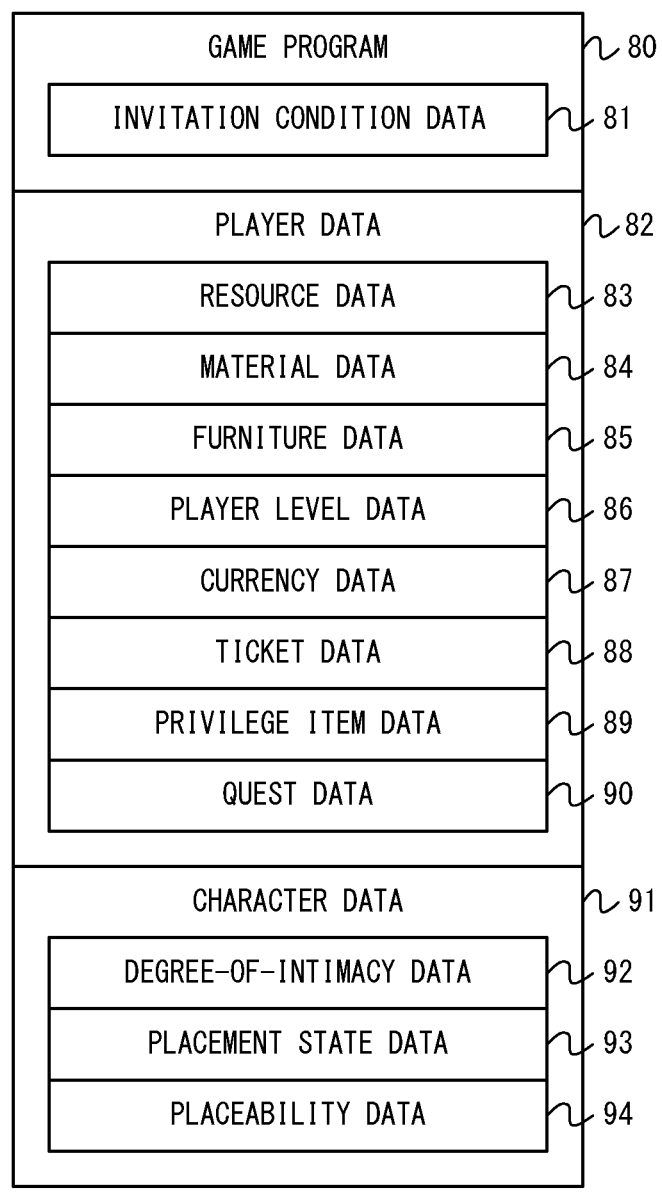
FIG. 12 is a diagram showing non-limiting examples of various types of data used in a terminal process executed by the information processing apparatus.

First, a description is given of an example of the process executed by the information processing apparatus 2, which is the terminal side (referred to as a "terminal process"). FIG. 12 is a diagram showing examples of various types of data used in the terminal process executed by the information processing apparatus 2. The various types of data shown in FIG. 12 are stored in the memory of the processing section 21 or the storage section 22 of the information processing apparatus 2.

As shown in FIG. 12, the information processing apparatus 2 stores a game program 80. The game program 80 is a game program for executing the game according to the exemplary embodiment, and for example, is stored in the storage section 22. The game program 80 includes invitation condition data 81. As described above, the invitation condition data 81 indicates, with respect to each animal character, the association between the animal character and an invitation condition. It should be noted that the content of the invitation condition data 81 may be changed in accordance with the update of the game program. Further, the game program 80 includes data indicating various types of information regarding each animal character that appears in the game (e.g., information indicating the personality and the species of the animal character, and the like).

Further, as shown in FIG. 12, the information processing apparatus 2 stores player data 82 and character data 91. The data 82 and 91 is generated and used in information processing described later (FIGS. 13 to 18).

The player data 82 is data regarding the player (or the player character 31). Specifically, the player data 82 includes resource data 83, material data 84, furniture data 85, player level data 86, currency data 87, ticket data 88, privilege item data 89, and quest data 90.

The resource data 83 indicates the types and the number of resources owned by the player character 31. The material data 84 indicates the types and the number of materials owned by the player character 31. The furniture data 85 indicates the types of pieces of furniture owned by the player character 31 and the placement states of the pieces of furniture. The player level data 86 indicates the current player level of the player. The currency data 87 indicates the amount of currency owned by the player character 31. The ticket data 88 indicates the number of tickets owned by the player character 31. The privilege item data 89 indicates the types and the number of privilege items owned by the player character 31. Here, a "privilege item" refers to an item to be given as a privilege to the player when the player satisfies a predetermined acquisition condition. In the exemplary embodiment, the above calling item is one of privilege items. It should be noted that the above ticket may be given to the player as one of privilege items. That is, the above ticket may be able to be acquired for a fee without satisfying the acquisition condition and also able to be acquired free of charge when the acquisition condition is satisfied. The quest data 90 indicates the content of a quest accepted by the player character 31 (specifically, an animal character having requested the quest, the fulfillment condition of the quest, and the fulfillment situation of the quest).

The above character data 91 is data regarding an animal character. Although not shown in FIG. 12, the character data 91 is stored with respect to each animal character. The character data 91 includes degree-of-intimacy data 92, placement state data 93, and placeability data 94.

The degree-of-intimacy data 92 indicates the degree of intimacy between the player character 31 and the animal character. Specifically, the degree-of-intimacy data 92 includes data indicating the degree-of-intimacy points and data indicating the degree-of-intimacy level. The placement state data 93 indicates the placement state of the animal character. Specifically, the placement state data 93 includes data indicating whether or not the animal character is placed in the game space, and data indicating the placement position of the animal character in a case where the animal character is placed in the game space. The placeability data 94 indicates whether or not the animal character can be placed as a periodically placed character in the game space (in other words, whether or not the animal character is included in the above placeable characters).

[3-1-1. Flow of Entirety of Terminal Process]

Figure 13:
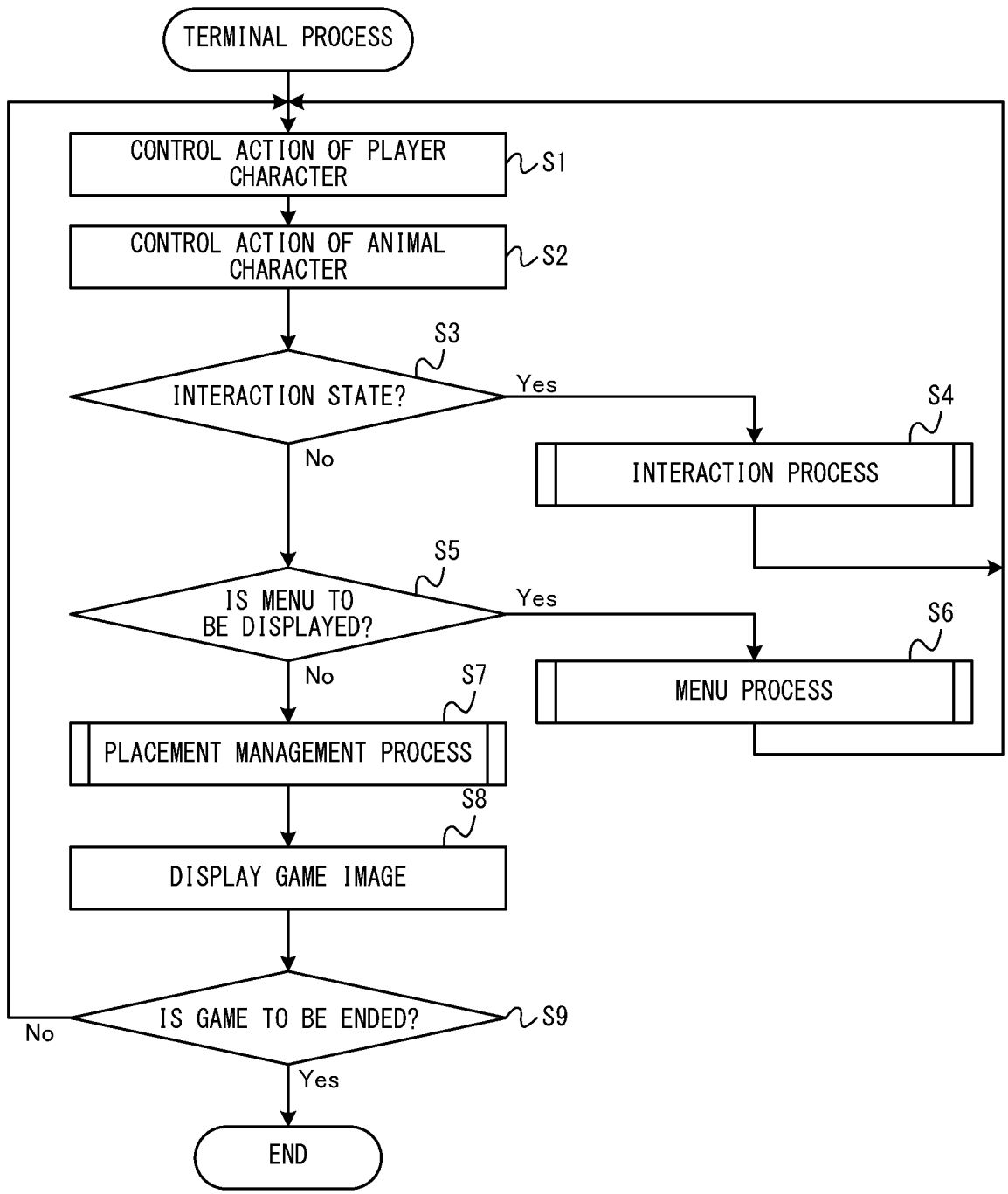
FIG. 13 is a flow chart showing a non-limiting example of the flow of a terminal process executed by the information processing apparatus.

FIG. 13 is a flow chart showing an example of the flow of the terminal process executed by the information processing apparatus. It should be noted that a series of processes shown in FIG. 13 is started in accordance with the fact that a predetermined condition is satisfied (e.g., an instruction to play the game is given by the player) after the game program stored in the storage section 12 is started.

It should be noted that in the exemplary embodiment, the description is given on the assumption that the processes of steps shown in FIGS. 13 to 19 are executed by the CPU (in other words, a processor) of the processing section 11 of the server 1 or the processing section 21 of the information processing apparatus 2 executing the game program stored in the storage section 12 or 22. In another exemplary embodiment, however, some of the processes of the above steps may be executed by a processor (e.g., a dedicated circuit or the like) different from from the CPU. Further, in a case where the information processing apparatus 2 can communicate with the server 1, some of the processes of the steps shown in FIGS. 13 to 19 may be executed by the server 1. Further, some of the processes of the steps shown in FIG. 19 may be executed by the information processing apparatus 2. Further, the processes of the steps shown in FIGS. 13 to 19 are merely illustrative. Thus, the processing order of the steps may be changed, or another process may be performed in addition to (or instead of) the processes of the steps, so long as similar results are obtained.

Further, the processing section 21 of the information processing apparatus 2 executes the processes of the steps shown in FIGS. 13 to 18, using the memory (or the storage section 22). That is, the CPU of the processing section 21 stores, in the memory, data obtained by the processing steps. When the CPU uses the data in the subsequent processing steps, the CPU reads the data from the memory and uses the data.

In step S1 shown in FIG. 13, in accordance with an operation by the player, the processing section 21 controls the action of the player character 31. That is, the processing section 21 acquires, from the input section 23, data indicating an input provided for the input section 23, and based on the input, controls the action of the player character 31. Consequently, for example, the player character 31 moves in the game space, acquires a resource, or talks to an animal character. After step S1, the process of step S2 is executed.

In step S2, the processing section 21 controls the action of an animal character placed in the game space. For example, in accordance with an algorithm determined in the game program, the processing section 21 causes an animal character to move or perform a predetermined action. Further, when a piece of furniture corresponding to an animal character invited to the campground is placed in the campground, the processing section 21 causes the animal character to perform an action on the piece of furniture. After step S2, the process of step S3 is executed.

In step S3, the processing section 21 determines whether or not the player character 31 and the animal character are in the above interaction state. When the result of the determination in step S3 is affirmative, the process of step S4 is executed. When, on the other hand, the result of the determination in step S3 is negative, the process of step S5 is executed.

In step S4, the processing section 21 executes an interaction process. The interaction process is a process executed in the interaction state, and is the process of changing various parameters (e.g., the degree of intimacy, a material, and the like) in accordance with the interaction action of the player character 31. The details of the interaction process will be described later (see FIG. 14). After the interaction process in step S4 ends, the process of the above step S1 is executed again.

In step S5, the processing section 21 determines whether or not an instruction to display the menu image is given. In the exemplary embodiment, a game image displayed on the display section 24 includes an image (not shown) representing an instruction to display the menu image. The processing section 21 determines whether or not the operation of touching this image is performed. When the result of the determination in step S5 is affirmative, the process of step S6 is executed. When, on the other hand, the result of the determination in step S5 is negative, the process of step S7 is executed.

In step S6, the processing section 21 executes a menu process. The menu process is the process of displaying the menu image, receiving various instructions, and executing processes corresponding to the instructions. The details of the menu process will be described later (see FIG. 16). After the menu process in step S6 ends, the process of the above step S1 is executed again.

In step S7, the processing section 21 executes a placement management process. The placement management process is the process of managing the placement of animal characters. That is, in the placement management process, the placement of the above periodically placed character and calling target character are controlled. The details of the placement management process will be described later (see FIG. 18). After the placement management process in step S7 ends, the process of step S8 is executed.

In step S8, the processing section 21 displays a game image on the display section 24. Specifically, based on the player data 82 and the character data 91 stored in the memory, the processing section 21 generates a game image representing the game space including the player character 31 and displays the game image on the display section 24. After step S8, the process of step S9 is executed.

In step S9, the processing section 21 determines whether or not the game is to be ended. That is, the processing section 21 determines whether or not an instruction to end the game application is given by the player. When the result of the determination in step S9 is negative, the process of step S1 is executed again. Subsequently, the series of processes of steps S1 to S9 is repeatedly executed until it is determined that the game is to be ended. It should be noted that the series of processes of steps S1 to S9 except for steps S4 and S6 is executed once a predetermined time (e.g., one frame time). When, on the other hand, the result of the determination in step S9 is affirmative, the processing section 21 ends the terminal process shown in FIG. 13.

[3-1-2. Interaction Process]

Figure 14:
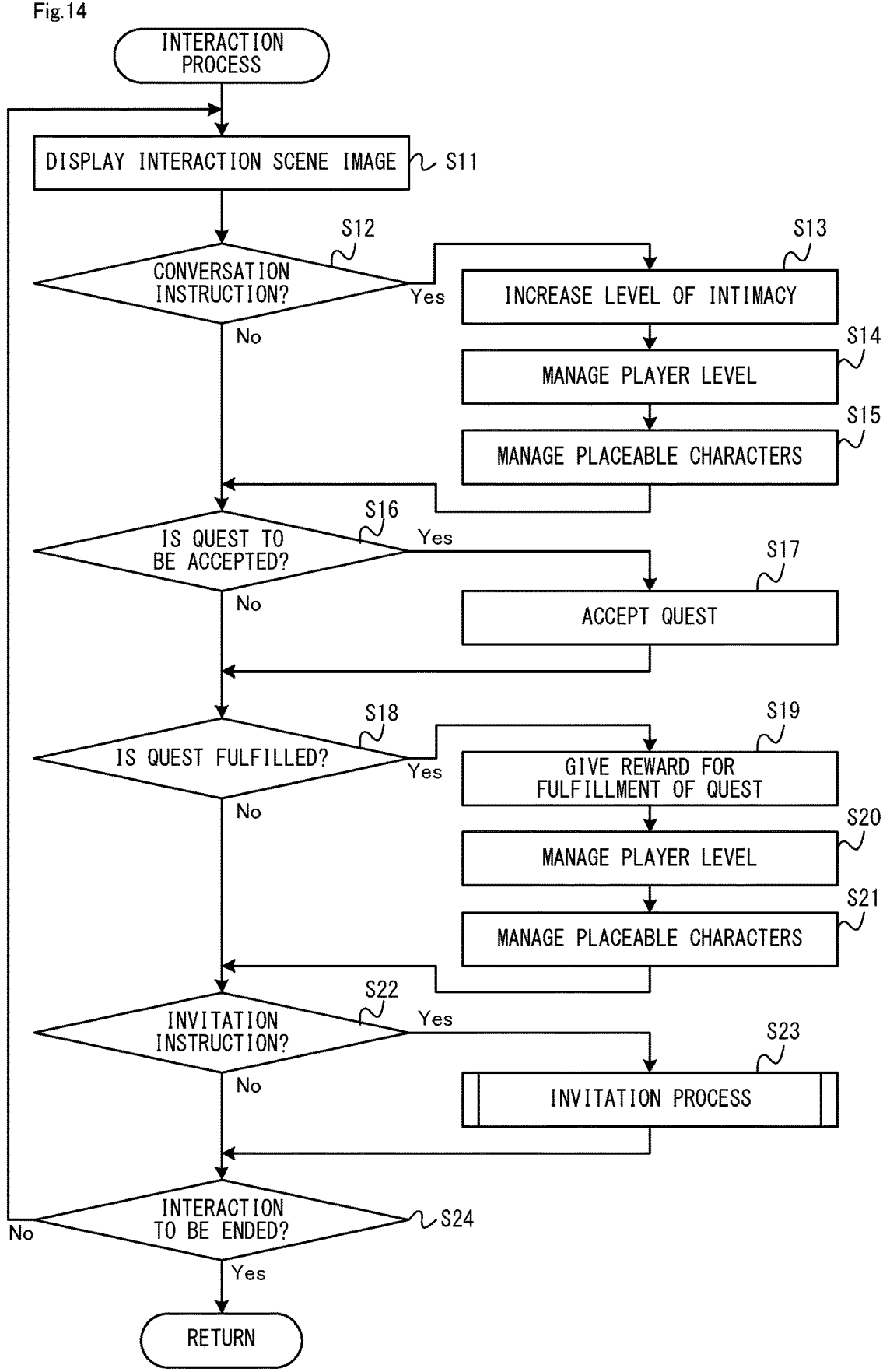
FIG. 14 is a sub-flow chart showing a non-limiting example of the detailed flow of an interaction process (step S4 shown in FIG. 13)

FIG. 14 is a sub-flow chart showing an example of the detailed flow of the above interaction process (step S4 shown in FIG. 13). In the interaction process, first, in step S11, the processing section 21 displays the above interaction scene image (see FIG. 5) on the display section 24. After step S11, the process of step S12 is executed.

In step S12, the processing section 21 determines whether or not the above conversation instruction is given by the player. That is, the processing section 21 acquires, from the input section 23, data indicating an input provided for the input section 23, and based on the input, determines whether or not the conversation instruction is given. It should be noted that also in the process of determining whether or not another instruction is given (e.g., steps S16, S18, S22, and the like described later), similarly to the process of step S12, the determination process is executed based on data indicating an input to the input section 23. When the result of the determination in step S12 is affirmative, the process of step S13 is executed. When, on the other hand, the result of the determination in step S12 is negative, the processes of steps S13 to S15 are skipped, and the process of step S16 is executed.

In step S13, the processing section 21 increases the degree of intimacy regarding the animal character in the interaction state with the player character 31. Specifically, the processing section 21 updates the degree-of-intimacy data 92 regarding the animal character so that the degree-of-intimacy points increase by an amount given in accordance with a conversation. Further, when the degree-of-intimacy level increases in accordance with an increase in the degree-of-intimacy points, the processing section 21 updates the degree-of-intimacy data 92 so as to increase the degree-of-intimacy level regarding the animal character. It should be noted that when the process of step S13 is executed, the processing section 21 executes the process of causing the player character 31 and the animal character to converse with each other (more specifically, displaying a conversation in the conversation field 48). After step S13, the process of step S14 is executed.

In step S14, the processing section 21 manages the player level. That is, the processing section 21 determines whether or not the player level is to be increased in accordance with the increase in the degree-of-intimacy points in the process of step S13. Then, when it is determined that the player level is to be increased, the processing section 21 updates the player level data 86 so as to indicate the increased player level. It should be noted that when it is determined that the player level is not to be increased, the processing section 21 does not update the player level data 86. After step S14, the process of step S15 is executed.

In step S15, the processing section 21 manages placeable characters. That is, when the player level is increased in the above step S14, then in accordance with the increase in the player level, the processing section 21 increases placeable characters. Specifically, the processing section 21 updates the placeability data 94 regarding an animal character newly included in placeable characters to a content indicating that the animal character can be placed. After step S15, the process of step S16 is executed.

In step S16, the processing section 21 determines whether or not the player character 31 is to accept a quest. Specifically, the processing section 21 determines whether or not the current state is the state where a quest regarding the animal character in the interaction state is not accepted, and the above quest instruction is given by the player. It should be noted that with reference to the quest data 90 stored in the memory, it can be determined whether or not the current state is the state where a quest regarding the animal character is not accepted. When the result of the determination in step S16 is affirmative, the process of step S17 is executed. When, on the other hand, the result of the determination in step S16 is negative, the process of step S17 is skipped, and the process of step S18 is executed.

In step S17, the processing section 21 executes the process of accepting the quest. The process of step S17 is the process described in the above "[2-2-2. Action Regarding Quest]". That is, the processing section 21 determines a quest that the player character 31 is requested to perform, and in accordance with the fact that an instruction to accept the determined quest is given by the player, sets the quest for the player character 31. At this time, the processing section 21 updates the quest data 90 so as to add data indicating the content of the accepted quest. After step S17, the process of step S18 is executed.

In step S18, the processing section 21 determines whether or not the player character 31 fulfills the quest. Specifically, the processing section 21 determines whether or not the current state is the state where the quest regarding the animal character in the interaction state is accepted, and the above quest instruction is given by the player. It should be noted that by the following method, it is determined whether or not the current state is the state where the quest regarding the animal character is fulfilled. Based on the quest data 90, it is determined whether or not the current state is the state where the quest is accepted. Further, based on the resource data 83, it is determined whether or not the accepted quest is fulfilled. When the result of the determination in step S18 is affirmative, the process of step S19 is executed. When, on the other hand, the result of the determination in step S18 is negative, the processes of steps S19 to S21 are skipped, and the process of step S22 is executed.

In step S19, the processing section 21 gives a reward corresponding to the fulfillment of the quest to the player character 31. That is, in accordance with the fulfillment of the quest, the processing section 21 increases the degree of intimacy regarding the animal character in the interaction state. In accordance with the fulfillment of the quest, the processing section 21 also gives a material and currency to the player character 31. Further, the processing section 21 causes the animal character 32 to perform the action of giving the material and the currency to the player character 31. In the above step S19, the processing section 21 updates the degree-of-intimacy data 92 regarding the animal character so as to increase the degree-of-intimacy points. Further, the processing section 21 updates the material data 84 and the currency data 87 so as to increase the material and the currency by the amounts of the given material and currency. After step S19, the process of step S20 is executed.

In step S20, the processing section 21 manages the player level. The process of step S20 is similar to the process of the above step S14. In step S20, however, in accordance with the increase in the degree-of-intimacy points in the process of step S19, the player level is increased. After step S20, the process of step S21 is executed.

In step S21, the processing section 21 manages placeable characters. The process of step S21 is similar to the process of the above step S15. In step S21, however, in accordance with the increase in the player level in the process of step S20, placeable characters are increased. After step S21, the process of step S22 is executed.

In step S22, the processing section 21 determines whether or not the invitation instruction is given. When the result of the determination in step S22 is affirmative, the process of step S23 is executed. When, on the other hand, the result of the determination in step S22 is negative, the process of step S23 is skipped, and the process of step S24 is executed.

In step S23, the processing section 21 executes an invitation process. The invitation process is the process of inviting the above invitation target character to the campground. The details of the invitation process will be described later (see FIG. 15). After the invitation process in step S23 ends, the process of step S24 is executed.

In step S24, the processing section 21 determines whether or not the interaction state is to be ended. That is, the processing section 21 acquires, from the input section 23, data indicating an input provided for the input section 23, and based on the input, determines whether or not the above end instruction is given by the player. When the result of the determination in step S24 is negative, the process of step S11 is executed again. Subsequently, the series of processes of steps S11 to S24 is repeatedly executed until it is determined that the game is to be ended. When, on the other hand, the result of the determination in step S24 is affirmative, the processing section 21 ends the interaction process shown in FIG. 14.

[3-1-3. Invitation Process]

Figure 15:
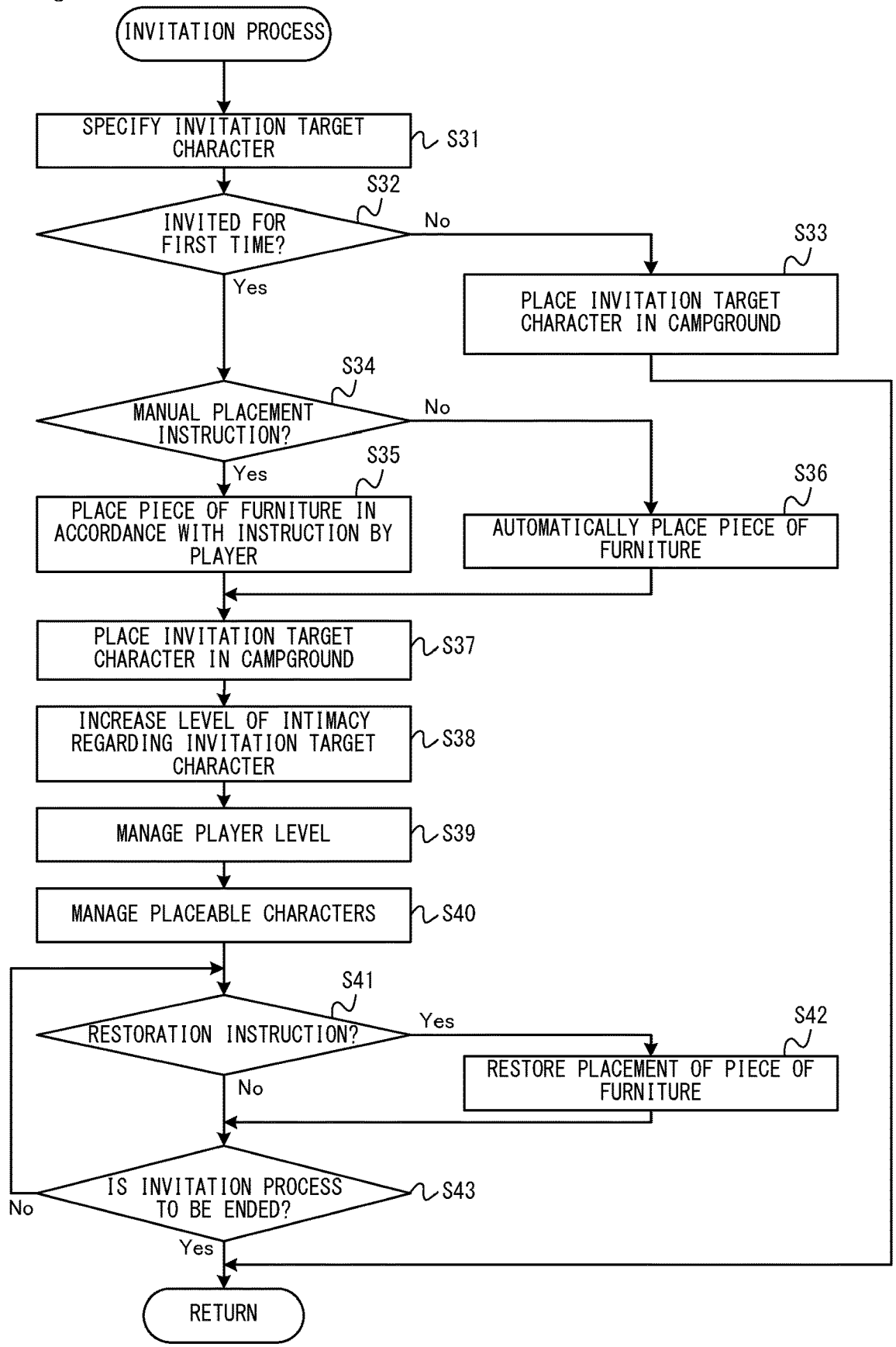
FIG. 15 is a sub-flow chart showing a non-limiting example of the detailed flow of an invitation process (step S23 shown in FIG. 14)

FIG. 15 is a sub-flow chart showing an example of the detailed flow of the above invitation process (step S23 shown in FIG. 14). In the invitation process, first, in step S31, the processing section 21 specifies an invitation target character. That is, the processing section 21 specifies the animal character in the interaction state as the invitation target character and displays the invitation condition image (see FIG. 7) regarding the invitation target character on the display section 24. It should be noted that based on the above invitation condition data 81, the processing section 21 generates the invitation condition image. After step S31, the process of step S32 is executed.

In step S32, the processing section 21 determines whether or not the invitation target character specified in step S31 is an animal character to be invited for the first time (i.e., an animal character that has not been invited to the campground). It should be noted that the processing section 21 stores, in the storage section 22, data indicating an animal character invited to the campground, and based on the data, makes the determination in step S32. When the result of the determination in step S32 is negative, the process of step S33 is executed. When, on the other hand, the result of the determination in step S32 is affirmative, the process of step S34 is executed.

In step S33, the processing section 21 places the invitation target character in the campground. Specifically, the processing section 21 updates the placement state data 93 regarding the invitation target character so as to indicate that the invitation target character is placed at a predetermined position in the campground. After step S33, the processing section 21 ends the invitation process.

On the other hand, in step S34, the processing section 21 determines whether or not the above manual placement instruction is given by the player. When the result of the determination in step S34 is affirmative (i.e., when the manual placement instruction is given), the process of step S35 is executed. When, on the other hand, the result of the determination in step S34 is negative (i.e., when the automatic placement instruction is given), the process of step S36 is executed.

In step S35, the processing section 21 places a piece of furniture at a position specified by the player. That is, the processing section 21 displays on the display section 24 a map image representing a map of the campground and receives an instruction to specify the position where the piece of furniture is to be placed in the map. Then, in accordance with the fact that an instruction to specify the position is given by the player, the processing section 21 updates the furniture data 85 so as to indicate that the piece of furniture is placed at the specified position. After step S35, the process of step S37 is executed.

On the other hand, in step S36, the processing section 21 automatically places a piece of furniture. That is, in accordance with a placement rule determined in advance in the game program 80, the processing section 21 determines the placement position of the piece of furniture and updates the furniture data 85 so as to indicate that the piece of furniture is placed at the determined position. After step S36, the process of step S37 is executed.

In step S37, the processing section 21 places the invitation target character in the campground. Specifically, the processing section 21 updates the placement state data 93 regarding the invitation target character so as to indicate that the invitation target character is placed at a predetermined position in the campground. In step S37, for example, the invitation target character is placed at a position near the position where the piece of furniture is placed in the process of step S35 or S36. Further, in step S37, based on the updated placement state data 93, the processing section 21 generates the above campground image (see FIG. 9) and displays the generated campground image on the display section 24. After step S37, the process of step S38 is executed.

In step S38, the processing section 21 increases the degree of intimacy regarding the invitation target character. Specifically, the processing section 21 updates the degree-of-intimacy data 92 regarding the invitation target character so as to increase the degree-of-intimacy points by an amount given in accordance with an invitation to the campground. Further, when the degree-of-intimacy level increases in accordance with an increase in the degree-of-intimacy points, the processing section 21 updates the degree-of-intimacy data 92 so as to increase the degree-of-intimacy level regarding the invitation target character. After step S39, the process of step S39 is executed.

In step S39, the processing section 21 manages the player level. The process of step S39 is similar to the process of the above step S14. In step S39, however, in accordance with the increase in the degree-of-intimacy points in the process of step S38, the player level is increased. After step S39, the process of step S40 is executed.

In step S40, the processing section 21 manages placeable characters. The process of step S40 is similar to the process of the above step S15. In step S40, however, in accordance with the increase in the player level in the process of step S39, placeable characters are increased. After step S40, the process of step S41 is executed.

In step S41, the processing section 21 determines whether or not the above restoration instruction is given by the player. When the result of the determination in step S41 is affirmative, the process of step S42 is executed. When, on the other hand, the result of the determination in step S41 is negative, the process of step S42 is skipped, and the process of step S43 is executed.

In step S42, the processing section 21 restores the placement of the piece of furniture changed by the process of the above step S35 or S36 to the placement state before the change. Specifically, the processing section 21 stores, in the memory, data indicating the placement state of the piece of furniture before the change and updates the furniture data 85 so as to indicate the placement state indicated by the data. At this time, based on the updated furniture data 85, the processing section 21 may generate a campground image and display the generated campground image on the display section 24. After step S42, the process of step S43 is executed.

In step S43, the processing section 21 determines whether or not the invitation process is to be ended. For example, when a predetermined time elapses since the campground image in which the invitation target character is placed in the campground is displayed, or when a predetermined end instruction is given by the player, the processing section 21 determines that the invitation process is to be ended. When the result of the determination in step S43 is negative, the process of step S41 is executed again. Subsequently, the series of processes of steps S41 to S43 is repeatedly executed until it is determined that the invitation process is to be ended. When, on the other hand, the result of the determination in step S43 is affirmative, the processing section 21 ends the invitation process.

It should be noted that in the exemplary embodiment, when the invitation process ends, the processing section 21 returns to the interaction process and executes the process. Then, the interaction scene image is displayed on the display section 24. In another exemplary embodiment, however, after the invitation process ends, the processing section 21 may cause the player character 31 to move to the campground, display the game space representing the campground, and continue the game.

[3-1-4. Menu Process]

Figure 16:
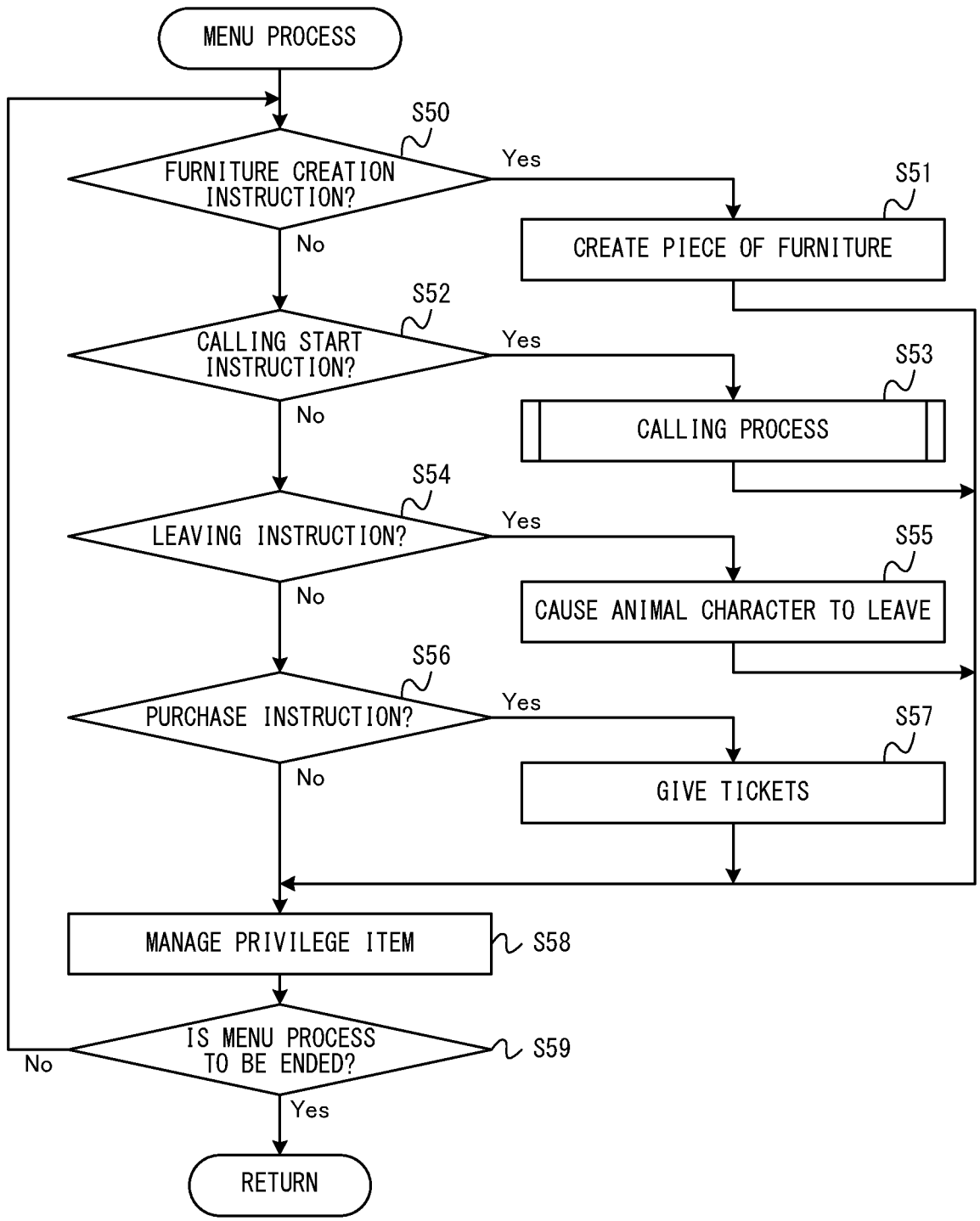
FIG. 16 is a sub-flow chart showing a non-limiting example of the detailed flow of a menu process (step S6 shown in FIG. 13)

FIG. 16 is a sub-flow chart showing an example of the detailed flow of the above menu process (step S6 shown in FIG. 13). In the menu process, first, in step S50, the processing section 21 determines whether or not the furniture creation instruction is given by the player. When the result of the determination in step S50 is affirmative, the process of step S51 is executed. When, on the other hand, the result of the determination in step S50 is negative, the process of step S52 is executed.

In step S51, the processing section 21 executes the process of creating a piece of furniture. Specifically, the processing section 21 executes the process described in the above "[2-3. Creation of Piece of Furniture]", thereby creating a piece of furniture specified by the player. Further, the processing section 21 also consumes a material and currency used to create the piece of furniture. At this time, the processing section 21 updates the furniture data 85 so as to indicate that the player character 31 owns the created piece of furniture. Further, the processing section 21 updates the material data 84 so as to reduce the material consumed for creating the piece of furniture, from the materials owned by the player character 31. Further, the processing section 21 updates the currency data 87 so as to reduce the currency consumed for creating the piece of furniture, from the currency owned by the player character 31. After step S51, the process of step S58 described later is executed.

In step S52, the processing section 21 determines whether or not the above calling start instruction is given by the player. When the result of the determination in step S52 is affirmative, the process of step S53 is executed. When, on the other hand, the result of the determination in step S52 is negative, the process of step S54 is executed.

In step S53, the processing section 21 executes a calling process. The calling process is the process of causing a calling target character selected by the player to appear in the game space. The details of the calling process will be described later (see FIG. 17). After step S53, the process of step S58 is executed.

In step S54, the processing section 21 determines whether or not the above leaving instruction is given by the player. When the result of the determination in step S54 is affirmative, the process of step S55 is executed. When, on the other hand, the result of the determination in step S54 is negative, the process of step S56 is executed.

In step S55, the processing section 21 causes an animal character specified by the player to leave the campground (i.e., executes the above leaving process). Specifically, the processing section 21 updates the placement state data 93 regarding the animal character specified by the player so as to indicate that the animal character is not placed in the game space (in other words, the campground). After step S55, the process of step S58 is executed.

In step S56, the processing section 21 determines whether or not the above purchase instruction is given by the player. When the result of the determination in step S56 is affirmative, the process of step S57 is executed. When, on the other hand, the result of the determination in step S56 is negative, the process of step S58 is executed.

In step S57, under the condition that the payment of a fee is completed, the processing section 21 increases the tickets owned by the player character 31. Using the communication section 25 (in other words, via the communication section 25), the processing section 21 first transmits, to the server 1, purchase request data indicating that tickets are to be purchased. It should be noted that the purchase request data includes data indicating the number of tickets that the player wishes to purchase. When the server 1 receives the above purchase request data, the server 1 executes a charging process. When the payment of a fee regarding the purchase of the tickets is completed, the server 1 transmits to the information processing apparatus 2 the above ticket giving data indicating the tickets to be given (step S95 described later). When the processing section 21 receives the above ticket giving data using the communication section 25, the processing section 21 updates the ticket data 88 so as to increase the tickets owned by the player character 31 by the number of purchased tickets. After step S57, the process of step S58 is executed.

In step S58, the processing section 21 manages a privilege item. Specifically, the processing section 21 makes to the server 1 a confirmation request to confirm whether or not there is a privilege item newly given to the player. In response to this confirmation request, the server 1 transmits, to the information processing apparatus 2, given privilege data indicating the content of a privilege item to be newly given, or indicating that there is no privilege to be given. When the processing section 21 receives the above given privilege data using the communication section 25, then in accordance with the content of the given privilege data, the processing section 21 gives a privilege item to the player character 31. Specifically, when a privilege item is to be newly given, the processing section 21 updates the privilege item data 89 so as to include the privilege item. After step S58, the process of step S59 is executed.

It should be noted that in the exemplary embodiment, the information processing apparatus 2 makes to the server 1 the confirmation request regarding a privilege item at the timing when the menu image is displayed (in other words, during the menu process). The timing when the confirmation request is made is optional. The confirmation request may be made at any timing while the game program is executed by the information processing apparatus 2.

In step S59, the processing section 21 determines whether or not the menu process is to be ended. For example, when a predetermined end instruction is given by the player, the processing section 21 determines that the menu process is to be ended. When the result of the determination in step S59 is negative, the process of step S50 is executed again. Subsequently, the series of processes of steps S50 to S59 is repeatedly executed until it is determined that the menu process is to be ended. When, on the other hand, the result of the determination in step S50 is affirmative, the processing section 21 ends the menu process.

[3-1-5. Calling Process]

Figure 17:
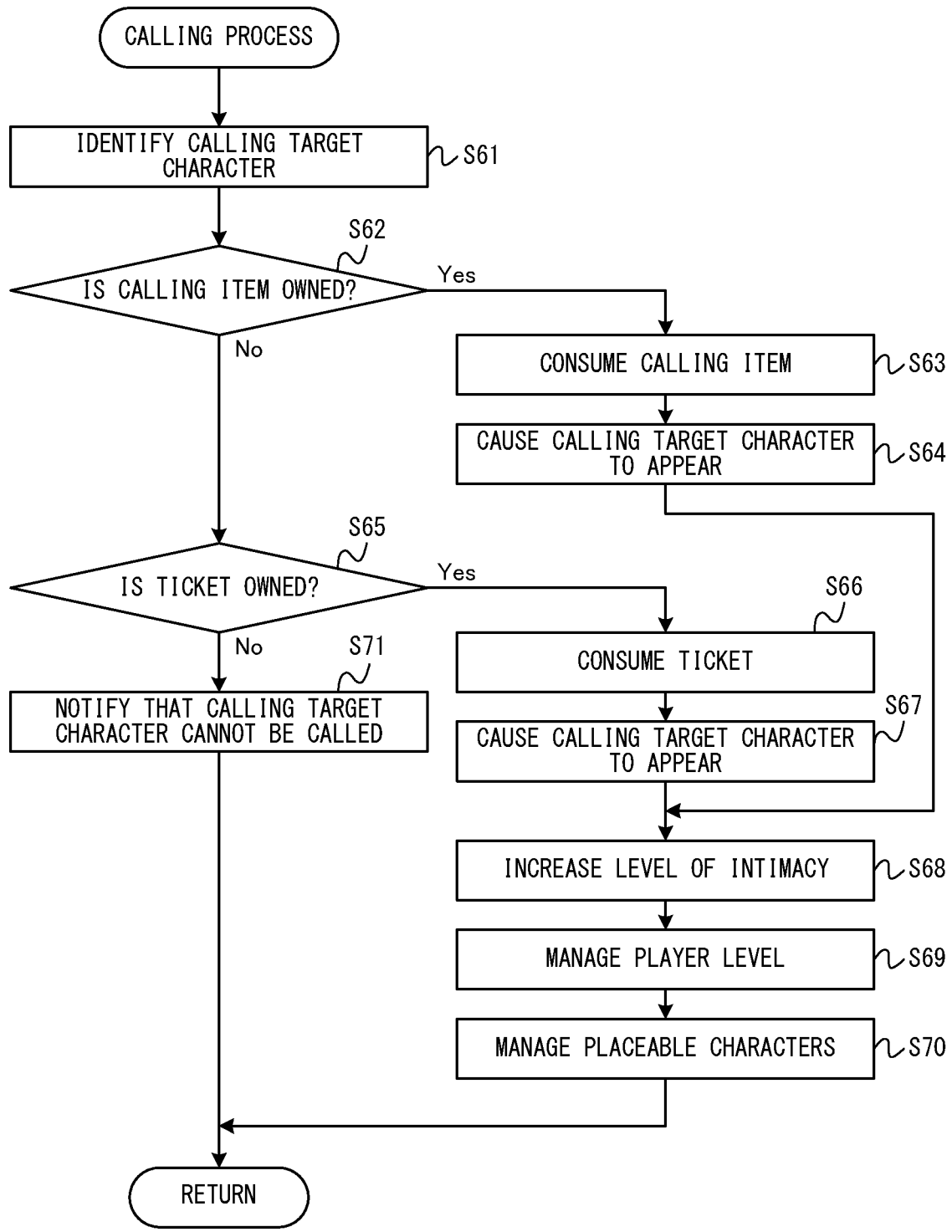
FIG. 17 is a sub-flow chart showing a non-limiting example of the detailed flow of a calling process (step S53 shown in FIG. 16)

FIG. 17 is a sub-flow chart showing an example of the detailed flow of the above calling process (step S53 shown in FIG. 16). In the calling process, first, in step S61, the processing section 21 identifies a calling target character. That is, the processing section 21 executes the process described in the above "[2-5-2. Management of Calling Target Character]", thereby allowing the player to select an animal character from among periodically placed characters. Then, the processing section 21 identifies the selected animal character as the calling target character. It should be noted that based on the placeability data 94 regarding each animal character, the processing section 21 can identify animal characters as the periodically placed characters. After step S61, the process of step S62 is executed.

In step S62, the processing section 21 determines whether or not the player character 31 owns a calling item necessary to call the calling target character. It should be noted that based on the privilege item data 89, the processing section 21 can confirm the number of calling items owned by the player character 31. When the result of the determination in step S62 is affirmative, the process of step S63 is executed. When, on the other hand, the result of the determination in step S62 is negative, the process of step S65 is executed.

In step S63, the processing section 21 consumes the calling item used to call the calling target character. That is, the processing section 21 updates the privilege item data 89 so as to indicate a number obtained by reducing the number of calling items used to call the calling target character, from the calling items owned by the player character 31. After step S63, the process of step S64 is executed.

In step S64, the processing section 21 causes the calling target character to appear in the game space. Specifically, the processing section 21 updates the placement state data 93 regarding the calling target character so as to indicate that the calling target character is placed in an area where the player character 31 is currently present. After step S64, the process of step S68 described later is executed.

On the other hand, in step S65, the processing section 21 determines whether or not the player character 31 owns a ticket necessary to call the calling target character. It should be noted that based on the ticket data 88, the processing section 21 can confirm the number of tickets owned by the player character 31. When the result of the determination in step S65 is affirmative, the process of step S66 is executed. When, on the other hand, the result of the determination in step S65 is negative, the process of step S71 is executed.

In step S66, the processing section 21 consumes the ticket used to call the calling target character. That is, the processing section 21 updates the ticket data 88 so as to indicate a number obtained by reducing the number of tickets used to call the calling target character, from the tickets owned by the player character 31. After step S66, the process of step S67 is executed.

In step S67, the processing section 21 causes the calling target character to appear in the game space. The process of step S67 is similar to the process of the above step S64. After step S67, the process of step S68 is executed.

In step S68, the processing section 21 increases the degree of intimacy regarding the calling target character. Specifically, the processing section 21 updates the degree-of-intimacy data 92 regarding the calling target character so as to increase the degree-of-intimacy points by an amount given in accordance with the calling of the calling target character to the area. Further, when the degree-of-intimacy level increases in accordance with an increase in the degree-of-intimacy points, the processing section 21 updates the degree-of-intimacy data 92 so as to increase the degree-of-intimacy level regarding the calling target character. After step S68, the process of step S69 is executed.

In step S69, the processing section 21 manages the player level. The process of step S69 is similar to the process of the above step S14. In step S69, however, in accordance with the increase in the degree-of-intimacy points in the process of step S68, the player level is increased. After step S69, the process of step S70 is executed.

In step S70, the processing section 21 manages placeable characters. The process of step S70 is similar to the process of the above step S15. In step S70, however, in accordance with the increase in the player level in the process of step S69, placeable characters are increased. After step S70, the processing section 21 ends the calling process.

On the other hand, in step S71, the processing section 21 notifies the player that the animal character cannot be called. For example, the processing section 21 displays on the display section 24 a message "Tickets or calling items necessary to call this animal character are insufficient". It should be noted that the processing section 21 displays this message for a predetermined time and then ends the process of step S71. After step S71, the processing section 21 ends the calling process.

[3-1-6. Placement Management Process]

Figure 18:
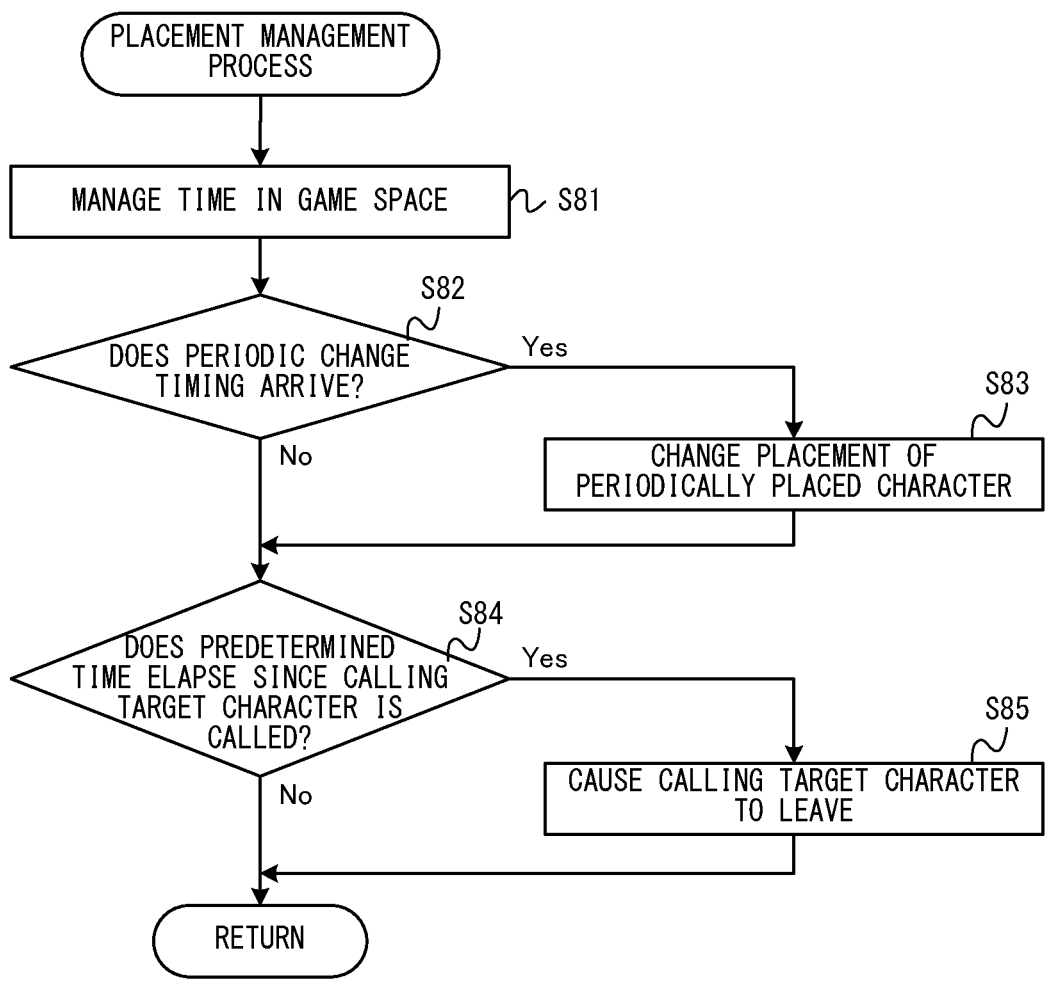
FIG. 18 is a sub-flow chart showing a non-limiting example of the detailed flow of a placement management process (step S7 shown in FIG. 13)

FIG. 18 is a sub-flow chart showing an example of the detailed flow of the above placement management process (step S7 shown in FIG. 13). In the placement management process, first, in step S81, the processing section 21 manages time in the game space. That is, in accordance with the lapse of real time, the processing section 21 advances time in the game. At this time, the processing section 21 stores, in the memory, data indicating the current time in the game (in other words, the current time). After step S81, the process of step S82 is executed.

In step S82, the processing section 21 determines whether or not the above periodic change timing arrives. When the result of the determination in step S82 is affirmative, the process of step S83 is executed. When, on the other hand, the result of the determination in step S82 is negative, the process of step S83 is skipped, and the process of step S84 is executed.

In step S83, the processing section 21 changes the placement state of a periodically placed character. Specifically, the processing section 21 erases from the game space a periodically placed character that has been placed up to this time. The processing section 21 also selects a new periodically placed character in each normal area by the method described in the above "[2-5-1. Management of Periodically Placed Character]" and places the selected periodically placed character in the normal area. At this time, the processing section 21 updates the placement state data 93 regarding the periodically placed character that has been placed up to this time and the newly placed periodically placed character so as to indicate that the new periodically placed character is placed in each normal area. After step S83, the process of step S84 is executed.

In step S84, the processing section 21 determines whether or not the above staying time elapses since the calling target character is placed in the game space. Here, when the calling target character is placed in the game space (the above steps S64 and S67), the processing section 21 measures the time elapsed since the calling target character is placed. Then, based on the measured elapsed time, the processing section 21 makes the determination in step S84. When the result of the determination in step S84 is affirmative, the process of step S85 is executed. When, on the other hand, the result of the determination in step S84 is negative, the processing section 21 ends the placement management process.

In step S85, when the time elapsed since the calling target character is called reaches the above staying time, the processing section 21 causes the calling target character to leave. Specifically, the processing section 21 updates the placement state data 93 regarding the calling target character so as to indicate that the calling target character is not placed in the game space. After step S85, the processing section 21 ends the placement management process.

[3-2. Process by Server 1]

Figure 19:
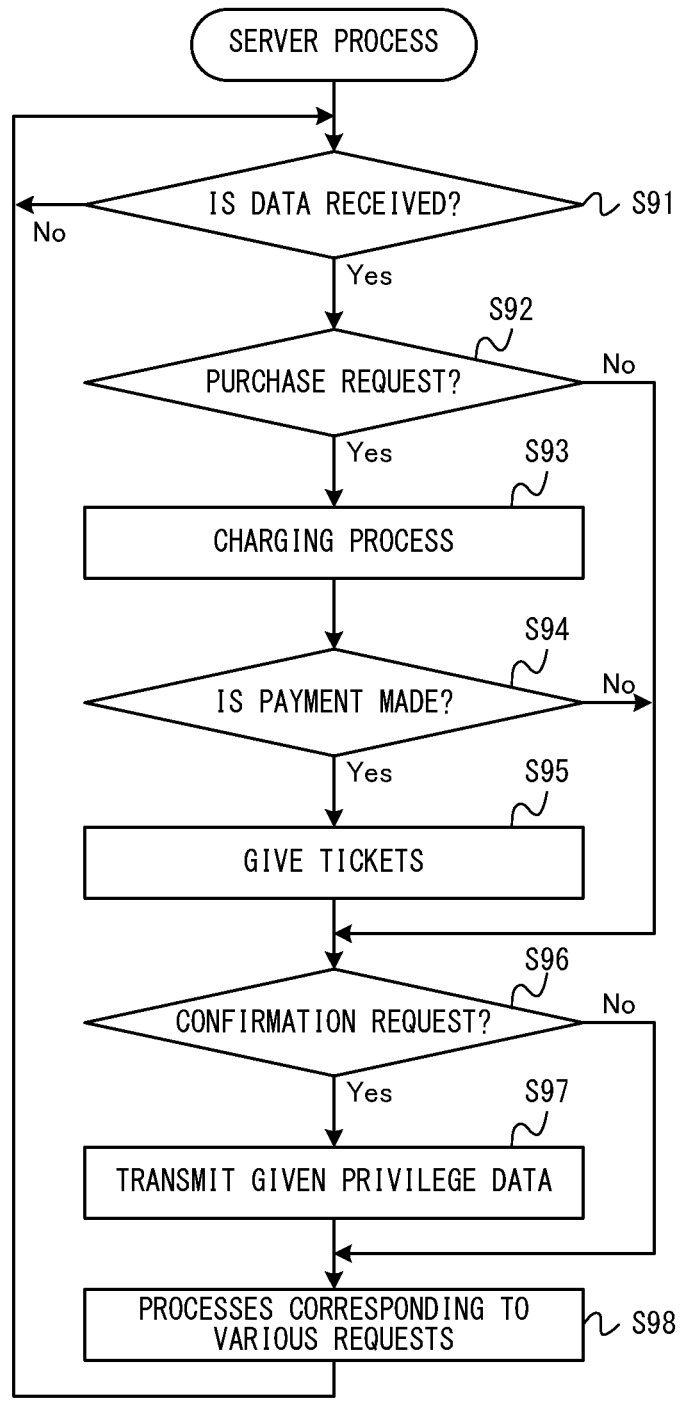
FIG. 19 is a flow chart showing a non-limiting example of the flow of a server process.

Next, a description is given of an example of the process executed by the server 1 (referred to as a "server process"). FIG. 19 is a flow chart showing an example of the flow of the server process. It should be noted that a series of processes shown in FIG. 19 is continuously executed during the operation of the server 1.

It should be noted that the server 1 stores in the storage section 12 or the memory the same data as the various types of data shown in FIG. 12. The server 1 and the information processing apparatus 2 communicate with each other at an appropriate timing, thereby synchronizing the various types of data stored in the server 1 with the various types of data stored in the information processing apparatus 2 (in other words, control is performed so that the content of the data stored in the server 1 matches the content of the data stored in the information processing apparatus 2).

Further, the processing section 11 of the server 1 executes the processes of the steps shown in FIG. 19, using the memory (or the storage section 12). That is, the CPU of the processing section 11 stores, in the memory, data obtained by the processing steps. When the CPU uses the data in the subsequent processing steps, the CPU reads the data from the memory and uses the data.

In the server process, in step S91, the processing section 11 determines whether or not data indicating various requests is received from the information processing apparatus 2 via the communication section 13. When the result of the determination in step S91 is affirmative, the process of step S92 is executed. When, on the other hand, the result of the determination in step S91 is negative, the process of step S91 is executed again. It should be noted that the process of step S91 is repeatedly executed, for example, once a predetermined time.

In step S92, the processing section 11 determines whether or not a request from the information processing apparatus 2 is the above purchase request. When the result of the determination in step S92 is affirmative, the process of step S93 is executed. When, on the other hand, the result of the determination in step S92 is negative, the processes of steps S93 to S95 are skipped, and the process of step S96 is executed.

In step S93, the processing section 11 executes a charging process regarding the purchase of tickets. The specific content of the charging process is optional. For example, when the amount of money that can be used to pay for a service of this game application is charged in advance, the processing section 11 executes the following process, for example. That is, in the above case, the processing section 11 transmits, to the information processing apparatus 2 via the communication section 13, a charging notification indicating that the amount of money according to the purchase of tickets is to be subtracted from the charged amount of money. It should be noted that the server 1 stores, in the storage section 12, amount-of-money data indicating the charged amount of money regarding the player. When the information processing apparatus 2 receives the above charging notification, the information processing apparatus 2 receives an instruction to determine whether or not to pay a fee. When an instruction to pay the fee is given by the player, the information processing apparatus 2 transmits to the server 1 a notification that the payment is permitted. When, on the other hand, an instruction not to pay the fee is given by the player, the information processing apparatus 2 transmits to the server 1 a notification that the payment is not permitted. When the processing section 11 receives a notification that the payment is permitted, the processing section 11 executes the process of subtracting the amount of money according to the purchase of the tickets from the charged amount of money. That is, the processing section 11 updates the above amount-of-money data so as to indicate the amount of money after the subtraction. When, on the other hand, the processing section 11 receives a notification that the payment is not permitted, the processing section 11 does not execute the process of updating the amount-of-money data. After step S93, the process of step S94 is executed.

In step S94, the processing section 11 determines whether or not the payment for the purchase of the tickets is made. That is, when the processing section 11 subtracts the amount of money according to the purchase of the tickets from the charged amount of money in the above step S93, the processing section 11 determines that the payment is made. When the processing section 11 does not subtract the amount of money according to the purchase of the tickets from the charged amount of money, the processing section 11 determines that the payment is not made. When the result of the determination in step S94 is affirmative, the process of step S95 is executed. When, on the other hand, the result of the determination in step S94 is negative, the process of step S95 is skipped, and the process of step S96 is executed.

In step S95, the processing section 11 gives the tickets to the player. That is, the processing section 11 updates the ticket data stored in the storage section 12 so as to increase the tickets owned by the player character 31 by the number of purchased tickets. Further, the processing section 11 transmits, to the information processing apparatus 2 via the communication section 13, the ticket giving data indicating the number of purchased tickets. Consequently, the information processing apparatus 2 updates the ticket data 88 (step S57), and the tickets are given to the player. That is, in the exemplary embodiment, after the server 1 executes a charging process for increasing tickets, and when the information processing apparatus 2 acquires information indicating that the payment of the fee regarding the purchase of the tickets is completed (i.e., the ticket giving data), the information processing apparatus 2 increases the number of tickets. After step S95, the process of step S96 is executed.

In step S96, the processing section 11 determines whether or not a request from the information processing apparatus 2 is the above confirmation request. When the result of the determination in step S96 is affirmative, the process of step S97 is executed. When, on the other hand, the result of the determination in step S96 is negative, the process of step S97 is skipped, and the process of step S98 is executed.

In step S97, the processing section 11 transmits the above given privilege data to the information processing apparatus 2. Specifically, the processing section 11 determines whether or not the above acquisition condition is satisfied regarding the player of the information processing apparatus 2 to which the confirmation request is made, thereby identifying the presence or absence and the type of a privilege item to be given to the player. Then, the processing section 11 transmits, to the information processing apparatus 2 via the communication section 13, the given privilege data indicating the identified content. By the above process, (when there is a privilege item to be given), the information processing apparatus 2 gives the privilege item to the player. After step S97, the process of step S98 is executed.

In step S98, the processing section 11 executes a process corresponding to a request from the information processing apparatus 2 (except for the above purchase request and confirmation request). For example, in accordance with a request from the information processing apparatus 2, the processing section 11 executes game processing where necessary and transmits game data corresponding to the request to the information processing apparatus 2. After step S98, the process of step S91 is executed again.

4. Operation and Effect and Variations of Exemplary Embodiment

According to the above exemplary embodiment, the information processing apparatus 2 has the following configurations.

Parameter management means for managing a character-associated parameter (the degree of intimacy in the above exemplary embodiment) associated with each of a plurality of character objects (animal characters in the above exemplary embodiment) and a player-associated first parameter (the number of pieces of furniture in the above exemplary embodiment) associated with a player (steps S13 and S19 in shown in FIG. 14, S38 in shown in FIG. 15, step S68 shown in FIG. 17)

Appearance condition storage means for storing an appearance condition (the invitation condition in the above exemplary embodiment) associated with each of the plurality of character objects (the invitation condition data 81 shown in FIG. 12)

Character specifying means for specifying at least one target character object from the plurality of character objects (S31 shown in FIG. 15)

Appearance permission means for, when the player-associated first parameter and the character-associated parameter associated with the target character object satisfies the appearance condition associated with the target character object, permitting the target character object to appear in a predetermined region in a virtual space (the area of the campground in the above exemplary embodiment) (S38 shown in FIG. 15)

According to the above configuration, when the appearance condition regarding both the character-associated parameter and the player-associated first parameter is satisfied, a character object is permitted to appear. According to this, to cause a certain character object to appear in the predetermined region, the player advances the game so as to satisfy the appearance condition for both the character-associated parameter regarding the character object and the player-associated first parameter set regardless of the character object. Thus, it is possible to improve the level of strategy of the game.

Specifically, the above "manage" means changing, storing, or changing and storing information (or data) as a management target.

In the above exemplary embodiment, the above target character object is specified by the player. Alternatively, in another exemplary embodiment, the above target character object may be specified by any method. For example, in another exemplary embodiment, the target character object may be specified by the information processing apparatus 2 (e.g., in accordance with a rule determined in advance in the game program). Specifically, in the above exemplary embodiment, the information processing apparatus 2 may specify an animal character to be selected from among animal characters satisfying the invitation condition in accordance with a predetermined rule.

"Permit (a character object) to appear" in the above description may be a form in which the character object is caused to appear in accordance with the fact that the appearance condition is satisfied, or may be a form in which the character object is caused to appear at a predetermined timing after the appearance condition is satisfied (e.g., the timing when the player gives an instruction to cause the character object to appear). For example, in the above exemplary embodiment, the movement of an animal character invited to the campground may be controlled by the game program so as to automatically move to the campground. Further, for example, in a game where a player performs a competition using a plurality of character objects, "permit (a character object) to appear" may refer to the state where the character object can be used.

(Variations Regarding Interaction Action)

In the above exemplary embodiment, a description has been given using as an example a game where the player character 31 operated by the player performs an interaction action with an animal character that appears in the game space. Here, in another exemplary embodiment, a game executed in the information processing system may be a game of a type in which a player character does not appear, and may be a game where a player and an animal character perform an interaction action with each other. For example, the information processing apparatus 2 may control the conversation action of an animal character so as to converse with the player.

(Variations Regarding Game Where Placement State Is Changed)

In the above exemplary embodiment, the information processing system executes, as the process of changing the placement state of an object, the process of causing the object to appear in the game space, or causing the object to leave the game space. Here, in another exemplary embodiment, the process of changing the placement state may not only be the process of causing the object to appear and leave, but also be the process of changing the position of the object in the game space. For example, as the process of changing the placement state, the information processing apparatus 2 may execute the process of causing an animal character that is placed at a position away from a player character (therefore needs to be moved for time so that the player character performs an interaction action with the animal character) to move to a position around the player character.

Further, in the above exemplary embodiment, a description has been given using as an example of the game executed in the information processing system, a game where a player character interacts with an animal character. However, the content of the game is optional. A technique according to the above exemplary embodiment can be applied to any game processing for changing the placement state of an object placed in a virtual space in accordance with selection by a player. For example, in another exemplary embodiment, in a game where an enemy object invades the territory of a player character, the information processing system may cause the enemy object approaching the territory of the player character with the lapse of time to move to a position away from the territory in accordance with a selection instruction given by the player.

The above exemplary embodiment can be used for, for example, a game system, a game apparatus, or a game program in order, for example, to improve interest regarding causing a character object to appear.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system comprising at least one computer processor and a memory,
the at least one computer processor configured to:
manage a character-associated parameter associated with each of a plurality of character objects, and a player-associated first parameter associated with a player and indicating the number of items of a first type owned in a game by the player;
in accordance with an operation being performed by the player on the character object placed in the virtual space, change the character-associated parameter associated with the character object;
stores in the memory an appearance condition associated with each of the plurality of character objects;
specify at least one target character object from among the plurality of character objects; and
when the player-associated first parameter and the character-associated parameter associated with the target character object satisfy the appearance condition associated with the target character object, permit the target character object to appear in a predetermined region in the virtual space.

2. The information processing system according to claim 1, wherein
the appearance condition is a condition satisfied when the character-associated parameter is equal to or greater than a predetermined value, and
when a predetermined action on the character object is performed by the player or a player character operated by the player, the at least one computer processor increases the character-associated parameter associated with the character object.

3. The information processing system according to claim 2, wherein
the predetermined action is at least either of conversing with the character object and fulfilling a request from the character object.

4. The information processing system according to claim 3, wherein
the request is fulfilled by delivering a predetermined item to each of the character objects.

5. The information processing system according to claim 1, wherein
based on a predetermined action performed between the player or a player character operated by the player and the character object placed in the virtual space, the at least one computer processor changes the player-associated first parameter.

6. The information processing system according to claim 1, wherein
the at least one computer processor:
further manages a player-associated second parameter associated with the player; and
under the condition that the player-associated second parameter is changed by a predetermined value, changes the player-associated first parameter.

7. The information processing system according to claim 6, wherein
in accordance with a predetermined action being performed between the player or a player character operated by the player and the character object placed in the virtual space, the at least one computer processor changes the player-associated second parameter.

8. The information processing system according to claim 6, wherein the player-associated second parameter indicates the number of items of a second type owned in the game by the player.

9. The information processing system according to claim 6, wherein
the at least one computer processor:
manages the player-associated second parameter of a plurality of types; and
in accordance with a predetermined action being performed between the player or a player character operated by the player and the character object placed in the virtual space, changes the player-associated second parameter of a type that can be used to change the player-associated first parameter related to the appearance condition associated with the character object.

10. The information processing system according to claim 1, wherein
the at least one computer processor:
manages placement states of the plurality of character objects in the virtual space, and
changes the placement state of at least one character object among the plurality of character objects in the virtual space in accordance with time.

11. The information processing system according to claim 10, wherein
the at least one computer processor changes the placement state of the character object in the virtual space in accordance with time, the character object being different from the target character object permitted to appear in the predetermined region in accordance with the satisfaction of the appearance condition.

12. The information processing system according to claim 10, wherein
the at least one computer processor permits a plurality of the target character objects to appear in the predetermined region.

13. The information processing system according to claim 10, wherein
in accordance with an instruction given by the player, the at least one computer processor causes the target character object placed in the predetermined region in accordance with the target character object being permitted to appear in the predetermined region, to leave the predetermined region.

14. The information processing system according to claim 13, wherein
the at least one computer processor causes the target character object permitted to appear in the predetermined region to appear in the predetermined region in a state where the target character object leaves the predetermined region, and in accordance with an instruction given by the player, and regardless of whether or not the appearance condition is satisfied at a time when the instruction is given.

15. The information processing system according to claim 1, wherein
in accordance with a placement instruction given by the player, the at least one computer processor places a placement object in the predetermined region,
the player-associated first parameter indicates the number of the placement objects owned in the game by the player, and
the appearance condition is that the placement object determined in accordance with the character object associated with the appearance condition is placed in the predetermined region.

16. The information processing system according to claim 15, wherein
when the appearance condition is satisfied, and in accordance with an automatic placement instruction given by the player, the at least one computer processor automatically determines a placement position in the predetermined region, thereby placing the placement object determined in accordance with the character object associated with the appearance condition.

17. The information processing system according to claim 15, wherein
when the placement object is placed in the predetermined region in accordance with the placement instruction given by the player, then in accordance with a restoration instruction given by the player, the at least one computer processor restores the placement of the placement object in the predetermined region to a state before the placement corresponding to the placement instruction is made.

18. The information processing system according to claim 15, wherein
in the predetermined region, the at least one computer processor causes the target character object satisfying the appearance condition to perform an action on the placement object determined in accordance with the target character object.

19. The information processing system according to claim 1, wherein
the at least one computer processor:
manages a permission candidate character object that can be specified as the target character object among the plurality of character objects; and
increases the number of the permission candidate character objects in accordance with the number of character objects satisfying the appearance condition.

20. An information processing apparatus comprising at least one computer processor and a memory, the at least one computer processor configured to:
- manage a character-associated parameter associated with each of a plurality of character objects, and a player-associated first parameter associated with a player and indicating the number of items of a first type owned in a game by the player;
- in accordance with an operation being performed by the player on the character object placed in the virtual space, change the character-associated parameter associated with the character object;
- stores in the memory an appearance condition associated with each of the plurality of character objects;
- specify at least one target character object from among the plurality of character objects; and
- when the player-associated first parameter and the character-associated parameter associated with the target character object satisfy the appearance condition associated with the target character object, permit the target character object to appear in a predetermined region in the virtual space.

21. A non-transitory computer-readable storage medium having stored therein an information processing program executed by a computer processor of an information processing apparatus,
- a memory accessible by the information processing apparatus having stored therein an appearance condition associated with each of a plurality of character objects,
- the information processing program causing the computer processor to execute:
  - managing a character-associated parameter associated with each of a plurality of character objects, and a player-associated first parameter associated with a player and indicating the number of items of a first type owned in a game by the player;
  - in accordance with an operation being performed by the player on the character object placed in the virtual space, changing the character-associated parameter associated with the character object;
  - specifying at least one target character object from among the plurality of character objects; and
  - when the player-associated first parameter and the character-associated parameter associated with the target character object satisfy the appearance condition associated with the target character object, permitting the target character object to appear in a predetermined region in the virtual space.

22. An information processing method executed by an information processing system,
- the information processing system having stored therein an appearance condition associated with each of a plurality of character objects,
- the information processing system configured to:
  - manage a character-associated parameter associated with each of a plurality of character objects, and a player-associated first parameter associated with a player and indicating the number of items of a first type owned in a game by the player;
  - in accordance with an operation being performed by the player on the character object placed in the virtual space, change the character-associated parameter associated with the character object;
  - specify at least one target character object from among the plurality of character objects; and
  - when the player-associated first parameter and the character-associated parameter associated with the target character object satisfy the appearance condition associated with the target character object, permit the target character object to appear in a predetermined region in the virtual space.

* * * * *